US012766493B2

(12) United States Patent
Zhong

(10) Patent No.: US 12,766,493 B2
(45) Date of Patent: Oct. 20, 2026

(54) EMISSIONS TREATMENT ARTICLES WITH MAGNETIC SUSCEPTOR MATERIAL AND CATALYTIC MATERIAL

(71) Applicant: CORNING INCORPORATED, Corning, NY (US)

(72) Inventor: Danhong Zhong, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 519 days.

(21) Appl. No.: 17/976,382

(22) Filed: Oct. 28, 2022

(65) Prior Publication Data

US 2023/0158482 A1 May 25, 2023

Related U.S. Application Data

(60) Provisional application No. 63/282,826, filed on Nov. 24, 2021.

(51) Int. Cl.
*B01J 35/33* (2024.01)
*B01D 53/94* (2006.01)
(Continued)

(52) U.S. Cl.
CPC .......... *B01J 35/33* (2024.01); *B01D 53/9454* (2013.01); *B01J 21/08* (2013.01); *B01J 35/45* (2024.01);
(Continued)

(58) Field of Classification Search
None
See application file for complete search history.

(56) References Cited

U.S. PATENT DOCUMENTS 3,581,489 A 6/1971 Camin et al.
5,180,559 A 1/1993 Ma
(Continued)

FOREIGN PATENT DOCUMENTS

CN 107288716 A 10/2017
EP 3556453 A1 10/2019
(Continued)

OTHER PUBLICATIONS

Dayte et al. ( Opportunities and challenges in the development of advanced materials for emission control catalysts), Nature Materials, vol. 20, pp. 1049-1059 (2021) (Year: 2021).*
(Continued)

*Primary Examiner* — Elizabeth Collister
(74) *Attorney, Agent, or Firm* — Irene L. Brookins

(57) ABSTRACT

An emissions treatment article comprises: a honeycomb body comprising porous ceramic walls having wall surfaces defining a plurality of inner channels; deposits comprising a magnetic susceptor material disposed on one or more portions of the porous ceramic walls; and a catalytic material within the honeycomb body and disposed separate from the deposits of the magnetic susceptor material. A first number of inner channels comprising the deposits comprising the magnetic susceptor material is greater than or equal to a second number of inner channels comprising the catalytic material. In one or more embodiments, the catalytic material is a three-way conversion (TWC) catalytic material. Methods of making and using the same are also provided.

15 Claims, 9 Drawing Sheets

(51) Int. Cl.

| | |
|---|---|
| ***B01J 21/08*** | (2006.01) |
| ***B01J 35/45*** | (2024.01) |
| ***B01J 35/50*** | (2024.01) |
| ***B01J 35/57*** | (2024.01) |
| ***B01J 37/02*** | (2006.01) |
| ***F01N 3/10*** | (2006.01) |
| ***F01N 3/28*** | (2006.01) |

(52) U.S. Cl.

CPC ............. *B01J 35/505* (2024.01); *B01J 35/57* (2024.01); *B01J 37/0228* (2013.01); *B01J 37/0244* (2013.01); *F01N 3/101* (2013.01); *F01N 3/2825* (2013.01); *F01N 3/2842* (2013.01); *B01D 2255/9155* (2013.01); *B01J 2235/00* (2024.01); *B01J 2235/30* (2024.01); *F01N 2330/30* (2013.01); *F01N 2370/04* (2013.01)

(56) References Cited

U.S. PATENT DOCUMENTS

2012/0258032 A1* 10/2012 Phillips .................... B01J 35/40 422/177
2017/0226907 A1 8/2017 Crawford et al.
2017/0298797 A1* 10/2017 Onoe .................... F01N 3/2828
2019/0309670 A1* 10/2019 Wang ........................ B01J 38/02
2019/0323401 A1 10/2019 Miyairi et al.

FOREIGN PATENT DOCUMENTS

GB 2231813 A 11/1990
GB 2582614 A * 9/2020 ............. B01D 53/94

OTHER PUBLICATIONS

Kato et al. (Characterization of secondary pores in washcoat layers and their effect on effective gas transport properties), Chemical Engineering Journal, vol. 324, 2017, p. 370-379 (Year: 2017).*
Ding et al. (Fe3O4@SiO2 Core/Shell Nanoparticles: The Silica Coating Regulations with a Single Core for Different Core Sizes and Shell Thicknesses) Chemistry of Materials 2012 24 (23), pp. 4572-4580 (Year: 2012).*
Tandon et al., "Measurement and prediction of filtration efficiency evolution of soot loaded diesel particulate filters", Chemical Engineering Science, vol. 65 , 2010, pp. 4751-4760.

* cited by examiner

EMISSIONS TREATMENT ARTICLES WITH MAGNETIC SUSCEPTOR MATERIAL AND CATALYTIC MATERIAL

CROSS REFERENCE TO RELATED APPLICATION

This application claims the benefit of priority under 35 U.S.C. § 119 of U.S. Provisional Application Ser. No. 63/282,826 filed on Nov. 24, 2021, the content of which is relied upon and incorporated herein by reference in its entirety.

BACKGROUND

Field

The present specification relates to articles, in particular emissions treatment articles, comprising porous bodies, such as porous ceramic honeycomb bodies comprising a magnetic susceptor material disposed on porous ceramic walls within the honeycomb body and a catalytic material within the honeycomb body, and methods of making and using such articles.

Technical Background

During cold start of a gasoline engine, emissions can be emitted before a three-way conversion (TWC) catalyst reaches its light-off temperature. Electrically Heated Catalyst (EHC) is an approach to increase bed temperature of a catalytic article and reduce emissions during cold start.

Many existing EHC designs utilize resistive heating, in which heat is generated through Joule heating of a conductive metallic body. Resistive heating requires direct connection of an electric circuit to the heating element, resulting in a cumbersome set-up.

EHC powered by induction heating does not require direct connection of an electric circuit to the heating element. Rather, induction heating can be applied to the catalytic article itself, no extra components are needed, and a coating process of an underlying substrate can be utilized with least modification.

With higher particulate (soot) emissions from gasoline direct injection (GDI) engines, gasoline particulate filters are incorporated into emissions systems.

Wall flow filters are employed to remove particulates from fluid exhaust streams, such as from combustion engine exhaust. Examples include ceramic soot filters used to remove particulates from diesel engine exhaust gases; and gasoline particulate filters (GPF) used to remove particulates from gasoline engine exhaust gases. For wall flow filters, exhaust gas to be filtered enters inlet cells and passes through the cell walls to exit the filter via outlet channels, with the particulates being trapped on or within the inlet cell walls as the gas traverses and then exits the filter.

There is an ongoing need to improve emissions alone or in conjunction with high FE and low pressure drop penalty for catalytic articles.

SUMMARY

Aspects of the disclosure pertain to porous ceramic honeycomb bodies comprising a magnetic susceptor material disposed on porous ceramic walls within the honeycomb body, and methods for their manufacture and use.

In an aspect, an article comprises: a honeycomb body comprising porous ceramic walls having wall surfaces defining a plurality of inner channels; deposits comprising a magnetic susceptor material disposed on one or more portions of the porous ceramic walls; and a catalytic material within the honeycomb body and disposed separate from the deposits of the magnetic susceptor material; wherein a first number of inner channels comprising the deposits comprising the magnetic susceptor material is greater than or equal to a second number of inner channels comprising the catalytic material.

In another aspect, an article comprises: a plugged honeycomb filter body comprising: porous ceramic walls; inlet channels which are plugged at a distal end of the plugged honeycomb filter body; outlet channels which are plugged at a proximal end of the plugged honeycomb filter body; deposits comprising a magnetic susceptor material disposed within the plugged honeycomb filter body disposed on one or more portions of the inlet channels and/or all of the outlet channels; a catalytic material within the plugged honeycomb filter body and disposed separate from the deposits of the magnetic susceptor material.

An aspect provides a method for making an emissions treatment article, the method comprising: coating a catalytic material within a honeycomb body comprising porous ceramic walls having wall surfaces defining a plurality of inner channels; and coating particles of a magnetic susceptor material within the honeycomb body such that the catalytic material is disposed separate from the particles of the magnetic susceptible material; and a first number of inner channels comprising the deposits comprising the magnetic susceptor material is greater than or equal to a second number of inner channels comprising the catalytic material.

Another aspect provides a method for making an emissions treatment article, the method comprising: coating a catalytic material within a plugged honeycomb filter body comprising porous ceramic walls defining a plurality of inner channels, wherein inlet channels are plugged at a distal end of the plugged honeycomb filter body, and outlet channels are plugged at a proximal end of the plugged honeycomb filter body; and coating particles of a magnetic susceptor material within the plugged honeycomb filter body, such that the catalytic material is disposed separate from the particles of the magnetic susceptible material; and deposits of the magnetic susceptor material are disposed on one or more portions of the porous ceramic walls.

A further aspect is a method for treating emissions from a gasoline engine, the method comprising: contacting a gaseous stream from the gasoline engine with an emission treatment article comprising: a honeycomb body comprising: a magnetic susceptor material disposed on one or more portions of porous ceramic walls having wall surfaces defining a plurality of inner channels; and a catalytic material within the honeycomb body, wherein the catalytic material is disposed separate from the magnetic susceptible material, and a first number of inner channels comprising the deposits comprising the magnetic susceptor material is greater than or equal to a second number of inner channels comprising the catalytic material.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

To assist those of skill in the art in making and using the disclosed articles and associated methods, reference is made to the accompanying figures, which are not to scale, wherein.

DETAILED DESCRIPTION

Figure 1:
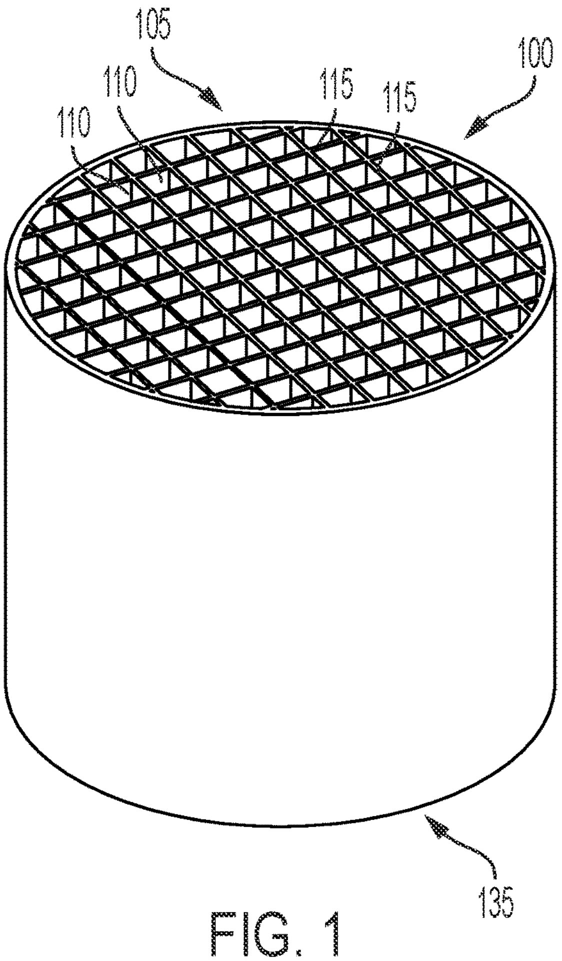
FIG. 1 schematically depicts a honeycomb body according to embodiments disclosed and described herein.

Reference will now be made in detail to embodiments of honeycomb bodies comprising porous ceramic walls with deposits comprising a magnetic susceptor material thereon and a catalytic material within the honeycomb body and disposed separate from the deposits of the magnetic susceptor material, embodiments of which are illustrated in the accompanying drawings. Whenever possible, the same reference numerals will be used throughout the drawings to refer to the same or like parts.

Aspects herein relate to articles, emissions treatment articles in particular, which are effective for filtration of particulates from gaseous streams and/or for catalytically converting combustion by-products such as carbon monoxides, nitrogen oxides, and hydrocarbons.

Advantageously, articles disclosed herein including deposits of magnetic susceptor material on top of channel walls of catalytically coated honeycomb substrates provide both high filtration efficiency and cold start conversion efficiency. When combined with a set of circuit-generating alternating electromagnetic field, the magnetic susceptor material generates heat from induction to help reaction, and at the same time the material can act as a filtration medium to provide high filtration efficiency. By including the magnetic susceptor material on one or more portions of all of porous ceramic walls within the honeycomb body, substantially even heating is achieved. Additionally, catalytic material is heated, which improves emissions treatment during cold start. Further, due to separation of the magnetic susceptor material from the catalytic material, local heating and sintering of the catalytic material is minimized or even avoided. Poisoning of the catalytic material is also minimized or even avoided. Reference to "separation from" or "disposed separate from" and the like means that there is no intentional mixing of the catalytic material, e.g., TWC catalytic material, and the magnetic susceptor material, but some minor migration of these materials and intermingling of these is permissible at interfaces.

The magnetic susceptor material can be deposited by methods suitable for delivering particles of the magnetic susceptor material within the honeycomb body. In one or more embodiments, particles of the magnetic susceptor material are delivered by an aerosol process. The catalytic material, e.g., three-way conversion (TWC) catalytic material, can be coated by methods suitable for delivering catalytic material within the honeycomb body. In one or more embodiments, the catalytic material is delivered by wash-coating with a slurry deposition.

In one or more embodiments, advantageously, the catalytic material comprises a three-way conversion (TWC) catalytic material. In one or more embodiments, the catalytic material comprises: a platinum group metal (PGM), alumina, and an oxygen storage component. In one or more embodiments, advantageously, the catalytic material comprises a selective catalytic reduction (SCR) catalyst. In one or more embodiments, the catalytic material comprises: a copper, a nickel or an iron promoted molecular sieve (e.g., a zeolite).

In embodiments, a loading of the catalytic material is between 0.5 g/in$^3$ (30 g/L) to 10 g/in$^3$ (600 g/L) within the honeycomb body, and all values and subranges therebetween, such as 0.5 g/in$^3$ (30 g/L) to 5 g/in$^3$ (300 g/L) and/or 0.5 g/in$^3$ (30 g/L) to 2.5 g/in$^3$ (150 g/L). Catalytic material within the honeycomb body refers to catalytic material disposed on walls and/or in pores of the walls. In specific embodiments, the loading of the catalytic material is in a range of from 35 to 150 g/L, 40 to 140 g/L, 50 to 130 g/L, 60 to 125 g/L, 70 to 120 g/L, 80 to 110 g/L, 90 to 100 g/L within the honeycomb body. Loading of the catalytic material is weight of added material in grams divided by the geometric part volume in liters. The geometric part volume is based on outer dimensions of the honeycomb filter body (or plugged honeycomb body).

In embodiments, a first number of inner channels comprising the deposits comprising the magnetic susceptor material is greater than or equal to a second number of inner channels comprising the catalytic material. This is advantageous for thorough heating of the catalytic material during cold start.

In one or more embodiments, deposition of the magnetic susceptor material within the honeycomb body to ensure separation from the catalytic material may be achieved by coating the catalytic material in pores of the porous ceramic walls and depositing the magnetic susceptor material on the porous ceramic walls.

In one or more embodiments, deposition of the magnetic susceptor material within the honeycomb body to ensure separation from the catalytic material may be achieved by coating the catalytic material within a first set of channels in the honeycomb body, and depositing the magnetic susceptor material on the porous ceramic walls within a second set of channels in the honeycomb body. Depositing the magnetic susceptor material within a second set of channels in the honeycomb body may further include some deposition into pores of the walls defining the second set of channels. In embodiments, the magnetic susceptor material is disposed between surfaces of the walls which define the second set of channels and a midpoint of the average thickness of the porous ceramic walls.

To further facilitate separation of the magnetic susceptor material from the catalytic material, it is also possible to deposit a layer of porous non-magnetic susceptor material before deposition of the magnetic susceptor material. In one or more embodiments, the non-magnetic susceptor materials comprise non-metallic materials.

Another approach to prevent interaction between the magnetic susceptor material and the catalytic material is to fill the ceramic walls with a permeable filler, such as carbon soot, after deposition of the catalytic material and prior to deposition of the magnetic susceptor material, so that the magnetic susceptor material is deposited only on-wall.

In one or more embodiments, deposition of the permeable filler within the honeycomb filter body is conducted in an apparatus that has a deposition chamber for housing the honeycomb body during deposition, inlet sources of filler material, (e.g., soot), and carrier gas (e.g., air) and an exhaust outlet. Pressure sensors are located an upstream position and a downstream position of the deposition chamber. Similarly, a particle sensor, e.g., a micro-soot sensor, is installed to monitor particle or soot concentration at an upstream position and a downstream position of the deposition chamber. Temperature sensors may also be installed at an upstream position and a downstream position of the deposition chamber. Soot is generated to simulate gasoline engine particulates in terms of soot morphology, chemistry and size distribution. An exemplary soot generator is a propane burner (Reproducible Exhaust Simulator (REXS burner), Matter Engineering Inc. In one or more embodiments, soot mobility mode diameter is 65/85/110 nm, with a lognormal geometric standard deviation of 1.8 and primary particle diameter of 20-35 nm. Combined flow rate of soot and carrier gas over time yields a desired loading, which may be apparatus-specific. Upon soot-loading to a desired amount, the soot-loaded plugged honeycomb filter body is moved to an apparatus for inorganic particle deposition, as discussed herein. For removal of the sacrificial filter/barrier layer, the soot- and inorganic particle-loaded plugged honeycomb filter body is exposed to a temperature in a range of greater than or equal to 600° C. to less than or equal to 1200° C., and all values and subranges therebetween.

A coating of catalytic material can extend a first axial distance of the article length, while the deposits of the magnetic susceptor material coating can extend a second axial distance, and the two materials do not overlap axially, to avoid poisoning of the catalytic material by the magnetic susceptor material. In one or more embodiments, a sum of the first axial distance and the second axial distance is less than a total axial distance, and the magnetic susceptor material is not intermingled with the catalytic material, in respective channels.

Another option is using core-shell nanoparticles to deliver the magnetic susceptor material as a core surrounded by a protective shell, and the catalytic material can be in-wall coating and the magnetic susceptor material-containing core-shell nanoparticles coating can be on top of the wall on either one side or both sides. This embodiment allows for minimum change of the coating process if the magnetic susceptor material is added after the filter is coated with TWC catalytic material.

In the case of using core-shell nanoparticles with catalyst decorated on the outer surface of the magnetic cores, only one layer of on-wall membrane is needed.

In one or more embodiments, the deposits comprise a plurality of core-shell nanoparticles comprised of a core of primary nanoparticles of the magnetic susceptor material encapsulated by a shell, the primary nanoparticles of the magnetic susceptor material having an average primary particle size in a range of 10 nanometer to 50 nanometers. In one or more embodiments, each of the shells of the core-shell nanoparticles comprises silica. In one or more embodiments, each of the core-shell nanoparticles is coated with the catalytic material, wherein the magnetic susceptor material is disposed separate from the catalytic material by the shell.

The magnetic susceptor material can be deposited by blowing the flow containing susceptor aerosol through the article. Permeability of the magnetic susceptor material can be controlled through material and process to minimize pressure drop penalty.

In one or more embodiments, the magnetic susceptor material comprises ferromagnetic or ferrimagnetic metals such as iron, cobalt, nickel or their alloys or oxides or combinations thereof. In the case that particles of the magnetic susceptor material are relatively large (micron level) or, when they form a connecting layer on top of the wall, the dominating heat generation mechanism is Joule heating and hysteresis. In the case that the particles of the magnetic susceptor material are in nano scale, they became superparamagnetic materials and the driving heating mechanism is Neel relaxation. The magnetic susceptor material is configured to generate heat in accordance with a varying magnetic field.

In one or more embodiments, the magnetic susceptor material can also be engineered core-shell nanoparticles. For example, the core-shell nanoparticles can have an iron oxide core surrounded by a silica shell. Such a core-shell system can prevent poisoning of catalytic material, and preserve the iron oxide core from undesired clustering and chemical alterations. With the core-shell nanoparticles, it is also possible to further engineer the particles to put catalytic material directly on an outer surface of magnetic susceptor material-cores for even more efficient heating.

In one or more embodiments, the deposits comprising a magnetic susceptor material further comprise a binder. In one or more embodiments, deposits comprise a network of aggregated agglomerates of the magnetic susceptor material and a binder. In one or more embodiments, the binder has high temperature resistance, e.g., is stable at temperatures of greater than 400° C. In one or more embodiments, the binder comprises a water-soluble silicate binder. In one or more embodiments, the binder comprises an alcohol-soluble alkoxysiloxane binder.

In one or more embodiments, the deposits comprising a magnetic susceptor material are effective as a filtration material. In embodiments, the filtration material is disposed on the walls to provide enhanced filtration efficiency, both locally through and at the wall and globally through the honeycomb body, at least in the initial use of the honeycomb body as a filter following a clean state, or regenerated state, of the honeycomb body, for example such as before a substantial accumulation of ash and/or soot occurs inside the honeycomb body after extended use of the honeycomb body as a filter.

In one aspect, the magnetic susceptor material is present as a layer disposed on the surface of one or more portions of all of the walls of the honeycomb structure. The layer in embodiments is porous to allow the gas flow through the wall. In embodiments, the layer is present as a continuous coating over at least part of the, or over the entire, surface of the one or more walls. In embodiments, the deposits of the magnetic susceptor material form a continuous layer on the wall surfaces defining a plurality of inner channels.

In another aspect, the magnetic susceptor material is present as a plurality of discrete regions of filtration material disposed on the surface of one or more of the walls of the honeycomb structure. The magnetic susceptor may partially block a portion of some of the pores of the porous walls, while still allowing gas flow through the wall. In embodiments of this aspect, the magnetic susceptor material is aerosol-deposited filtration material. In some preferred embodiments, the filtration material comprises a plurality of inorganic particle agglomerates, wherein the agglomerates are comprised of inorganic or ceramic or refractory material. In embodiments, the agglomerates are porous, thereby allowing gas to flow through the agglomerates.

Aspects of the disclosure pertain to articles such as catalytic articles and catalytic filtration articles, and methods for their manufacture and use. In embodiments, honeycomb bodies of the articles comprise a porous ceramic honeycomb structure of porous walls having wall surfaces defining a plurality of inner channels.

In embodiments, a honeycomb body comprises a porous ceramic honeycomb body comprising a first end, a second end, and a plurality of walls having wall surfaces defining a plurality of inner channels. A deposited material such as a magnetic susceptor material, which may be a porous inorganic layer, is disposed on one or more of the wall surfaces of the honeycomb body. The magnetic susceptor material, which may be a continuous porous inorganic layer, has a porosity in a range of from about 20% to about 95%, or from about 25% to about 95%, or from about 30% to about 95%, or from about 40% to about 95%, or from about 45% to about 95%, or from about 50% to about 95%, or from about 55% to about 95%, or from about 60% to about 95%, or from about 65% to about 95%, or from about 70% to about 95%, or from about 75% to about 95%, or from about 80% to about 95%, or from about 85% to about 95%, from about 30% to about 95%, or from about 40% to about 95%, or from about 45% to about 95%, or from about 50% to about 95%, or from about 55% to about 95%, or from about 60% to about 95%, or from about 65% to about 95%, or from about 70% to about 95%, or from about 75% to about 95%, or from about 80% to about 95%, or from about 85% to about 95%, or from about 20% to about 90%, or from about 25% to about 90%, or from about 30% to about 90%, or from about 40% to about 90%, or from about 45% to about 90%, or from about 50% to about 90%, or from about 55% to about 90%, or from about 60% to about 90%, or from about 65% to about 90%, or from about 70% to about 90%, or from about 75% to about 90%, or from about 80% to about 90%, or from about 85% to about 90%, or from about 20% to about 85%, or from about 25% to about 85%, or from about 30% to about 85%, or from about 40% to about 85%, or from about 45% to about 85%, or from about 50% to about 85%, or from about 55% to about 85%, or from about 60% to about 85%, or from about 65% to about 85%, or from about 70% to about 85%, or from about 75% to about 85%, or from about 80% to about 85%, or from about 20% to about 80%, or from about 25% to about 80%, or from about 30% to about 80%, or from about 40% to about 80%, or from about 45% to about 80%, or from about 50% to about 80%, or from about 55% to about 80%, or from about 60% to about 80%, or from about 65% to about 80%, or from about 70% to about 80%, or from about 75% to about 80%, and a continuous layer of the magnetic susceptor material has an average thickness of greater than or equal to 0.5 μm and less than or equal to 50 μm, or greater than or equal to 0.5 μm and less than or equal to 45 μm, greater than or equal to 0.5 μm and less than or equal to 40 μm, or greater than or equal to 0.5 μm and less than or equal to 35 μm, or greater than or equal to 0.5 μm and less than or equal to 30 μm, greater than or equal to 0.5 μm and less than or equal to 25 μm, or greater than or equal to 0.5 μm and less than or equal to 20 μm, or greater than or equal to 0.5 μm and less than or equal to 15 μm, greater than or equal to 0.5 μm and less than or equal to 10 μm. Average thickness may be determined by an overall average thickness (all channels in the honeycomb body) along entire axial length from inlet to outlet. Various embodiments of honeycomb bodies and methods for forming such honeycomb bodies will be described herein with specific reference to the appended drawings.

In one or more embodiments, the "filtration material" of magnetic susceptor material provides enhanced filtration efficiency to the honeycomb body, both locally through and at the wall and globally through the honeycomb body. In one or more embodiments, "filtration material" of magnetic susceptor material is not considered to be catalytically active in that it does not react with components of a gaseous mixture of an exhaust stream.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to".

A honeycomb body, as referred to herein, is a shaped ceramic honeycomb structure of intersecting walls to form cells the define channels. The ceramic honeycomb structure may be formed, extruded, or molded, and may be of any shape or size. For example, a ceramic honeycomb structure may be a filter body formed from cordierite or other suitable ceramic material.

A honeycomb body, as referred to herein, may also be defined as a shaped ceramic honeycomb structure having at least one layer applied to wall surfaces of the honeycomb structure, configured to filter particulate matter from a gas stream. There may be more than one layer applied to the same location of the honeycomb structure. The layer may comprise inorganic material, organic material or both inorganic material and organic material. For example, a honeycomb body may, in one or more embodiments, be formed from cordierite or other ceramic material and have a porous magnetic susceptor material layer applied to surfaces of the cordierite honeycomb structure.

The inner channels, when present, may have various cross-sectional shapes, such as circles, ovals, triangles, squares, pentagons, hexagons, or tessellated combinations or any of these, for example, and may be arranged in any suitable geometric configuration. The inner channels, when present, may be discrete or intersecting and may extend through the honeycomb body from a first end thereof to a second end thereof, which is opposite the first end.

With reference now to FIG. 1, a honeycomb body 100 according to one or more embodiments shown and described herein is depicted. The honeycomb body 100 may, in embodiments, comprise a plurality of walls 115 defining a plurality of inner channels 110. The plurality of inner channels 110 and intersecting channel walls 115 extend between first end 105, which may be an inlet end, and second end 135, which may be an outlet end, of the honeycomb body.

In one or more embodiments, the honeycomb body may be formed from cordierite, aluminum titanate, enstatite, mullite, forsterite, corundum (SiC), spinel, sapphirine, and periclase. In general, cordierite is a solid solution having a composition according to the formula $(Mg,Fe)_2Al_3(Si_5AlO_{18})$. In embodiments, the pore size of the ceramic material may be controlled, the porosity of the ceramic material may be controlled, and the pore size distribution of the ceramic material may be controlled, for example by varying the particle sizes of the ceramic raw materials. In addition, pore formers may be included in ceramic batches used to form the honeycomb body.

In embodiments, walls of the honeycomb body may have an average thickness from greater than or equal to 25 μm to less than or equal to 250 μm, such as from greater than or equal to 45 μm to less than or equal to 230 μm, greater than or equal to 65 μm to less than or equal to 210 μm, greater than or equal to 65 μm to less than or equal to 190 μm, or greater than or equal to 85 μm to less than or equal to 170 μm. The walls of the honeycomb body can be described to have a base portion comprised of a bulk portion (also referred to herein as the bulk), and surface portions (also referred to herein as the surface). The surface portion of the walls extends from a surface of a wall of the honeycomb body into the wall toward the bulk portion of the honeycomb body. The surface portion may extend from 0 (zero) to a depth of about 10 μm into the base portion of the wall of the honeycomb body. In embodiments, the surface portion may extend about 5 μm, about 7 μm, or about 9 μm (i.e., a depth of 0 (zero)) into the base portion of the wall. The bulk portion of the honeycomb body constitutes the thickness of wall minus the surface portions. Thus, the bulk portion of the honeycomb body may be determined by the following equation:

$$t_{total}-2t_{surface}$$

where $t_{total}$ is the total thickness of the wall and $t_{surface}$ is the thickness of the wall surface.

In one or more embodiments, the bulk of the honeycomb body (prior to applying any catalytic material or filtration material or layer) has a bulk median pore size from greater than or equal to 7 μm to less than or equal to 25 μm, such as from greater than or equal to 12 μm to less than or equal to 22 μm, or from greater than or equal to 12 μm to less than or equal to 18 μm. For example, in embodiments, the bulk of the honeycomb body may have bulk median pore sizes of about 10 μm, about 11 μm, about 12 μm, about 13 μm, about 14 μm, about 15 μm, about 16 μm, about 17 μm, about 18 μm, about 19 μm, or about 20 μm. Generally, pore sizes of any given material exist in a statistical distribution. Thus, the term "median pore size" or "$d_{50}$" (prior to applying any material or filtration material or layer) refers to a length measurement, above which the pore sizes of 50% of the pores lie and below which the pore sizes of the remaining 50% of the pores lie, based on the statistical distribution of all the pores. Pores in ceramic bodies can be manufactured by at least one of: (1) inorganic batch material particle size and size distributions; (2) furnace/heat treatment firing time and temperature schedules; (3) furnace atmosphere (e.g., low or high oxygen and/or water content), as well as; (4) pore formers, such as, for example, polymers and polymer particles, starches, wood flour, hollow inorganic particles and/or graphite/carbon particles.

In specific embodiments, the median pore size ($d_{50}$) of the bulk of the honeycomb body (prior to applying any material or filtration material or layer) is in a range of from 10 μm to about 16 μm, for example 13-14 μm, and the $d_{10}$ refers to a length measurement, above which the pore sizes of 90% of the pores lie and below which the pore sizes of the remaining 10% of the pores lie, based on the statistical distribution of all the pores is about 7 μm. In specific embodiments, the $d_{90}$ refers to a length measurement, above which the pore sizes of 10% of the pores of the bulk of the honeycomb body (prior to applying any material or filtration material or layer) lie and below which the pore sizes of the remaining 90% of the pores lie, based on the statistical distribution of all the pores is about 30 μm. In specific embodiments, the median or average diameter ($D_{50}$) of the secondary aggregate particles or agglomerates is about 2 microns. In specific embodiments, it has been determined that when the agglomerate median size $D_{50}$ and the median wall pore size of the bulk honeycomb body $d_{50}$ is such that there is a ratio of agglomerate median size $D_{50}$ to median wall pore size of the bulk honeycomb body $d_{50}$ is in a range of from 5:1 to 16:1, excellent filtration efficiency results and low pressure drop results are achieved. In more specific embodiments, a ratio of agglomerate median size $D_{50}$ to median wall pore size of the bulk of honeycomb body $d_{50}$ (prior to applying any material or filtration material or layer) is in a range of from 6:1 to 16:1, 7:1 to 16:1, 8:1 to 16:1, 9:1 to 16:1, 10:1 to 16:1, 11:1 to 16:1 or 12:1 to 6:1 provide excellent filtration efficiency results and low pressure drop results.

In embodiments, the bulk of the honeycomb body may have bulk porosities, not counting a coating, of from greater than or equal to 50% to less than or equal to 75% as measured by mercury intrusion porosimetry. Other methods for measuring porosity include scanning electron microscopy (SEM) and X-ray tomography, these two methods in particular are valuable for measuring surface porosity and bulk porosity independent from one another. In one or more embodiments, the bulk porosity of the honeycomb body may be in a range of from about 50% to about 75%, in a range of from about 50% to about 70%, in a range of from about 50% to about 65%, in a range of from about 50% to about 60%, in a range of from about 50% to about 58%, in a range of from about 50% to about 56%, or in a range of from about 50% to about 54%, for example.

In one or more embodiments, the surface portion of the honeycomb body has a surface median pore size from greater than or equal to 7 μm to less than or equal to 20 μm, such as from greater than or equal to 8 μm to less than or equal to 15 μm, or from greater than or equal to 10 μm to less than or equal to 14 μm. For example, in embodiments, the surface of the honeycomb body may have surface median pore sizes of about 8 μm, about 9 μm, about 10 μm, about 11 μm, about 12 μm, about 13 μm, about 14 μm, or about 15 μm.

In embodiments, the surface of the honeycomb body may have surface porosities, prior to application of a layer, of from greater than or equal to 35% to less than or equal to 75% as measured by mercury intrusion porosimetry, SEM, or X-ray tomography. In one or more embodiments, the surface porosity of the honeycomb body may be less than 65%, such as less than 60%, less than 55%, less than 50%, less than 48%, less than 46%, less than 44%, less than 42%, less than 40%, less than 48%, or less than 36% for example.

Figure 2:
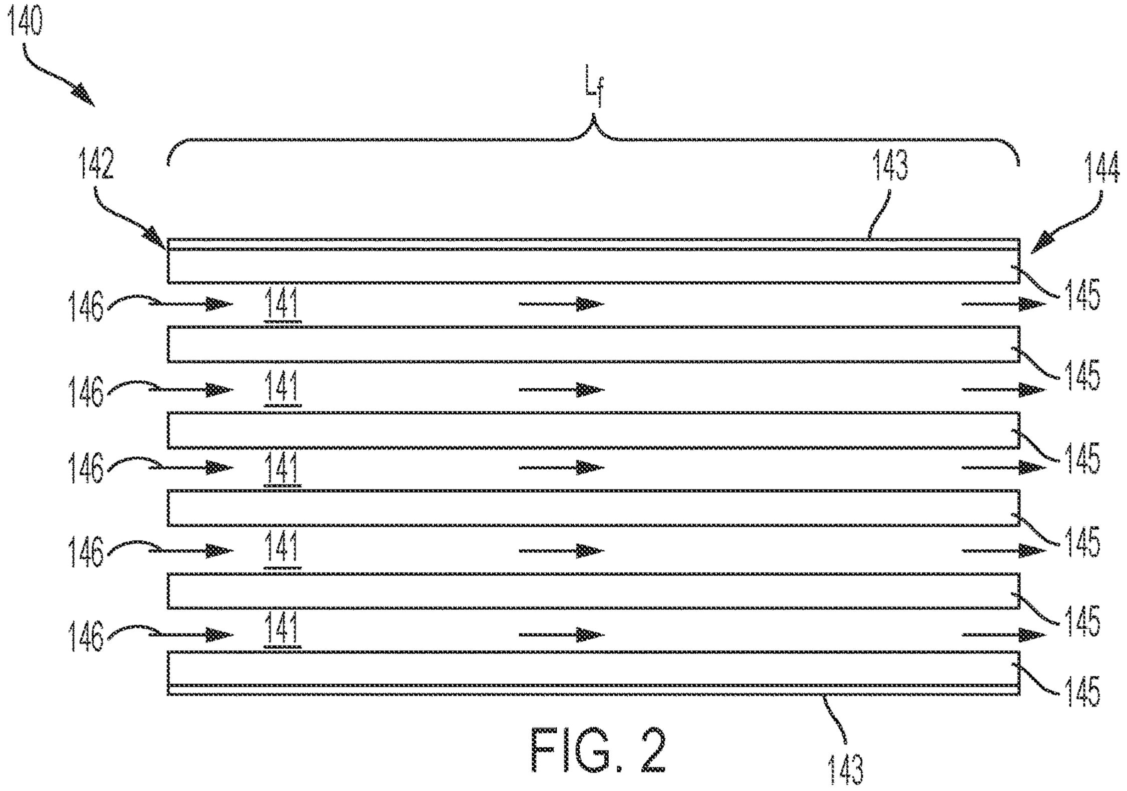
FIG. 2 is a cross-sectional longitudinal view of an exemplary flow-through substrate.

Turning to FIG. 2, shown is a cross-sectional longitudinal view of a honeycomb body in the form of a flow-through substrate. The substrate 140 may be used as an article to treat an exhaust gas stream 146, such as an exhaust gas stream emitted from a gasoline engine. The substrate 140 generally comprises a honeycomb body having a plurality of channels 141 or cells which extend between an inlet end 142 and an outlet end 144, defining an overall length $L_f$. The channels 141 of the substrate 140 are formed by, and at least partially defined by a plurality of intersecting channel walls 145 that extend from the inlet end 142 to the outlet end 144. The substrate 140 may also include a skin layer 143 surrounding the plurality of channels 141. This skin layer 143 may be extruded during the formation of the channel walls 145 or formed in later processing as an after-applied skin layer, such as by applying a skinning cement to the outer peripheral portion of the channels.

Figure 3:
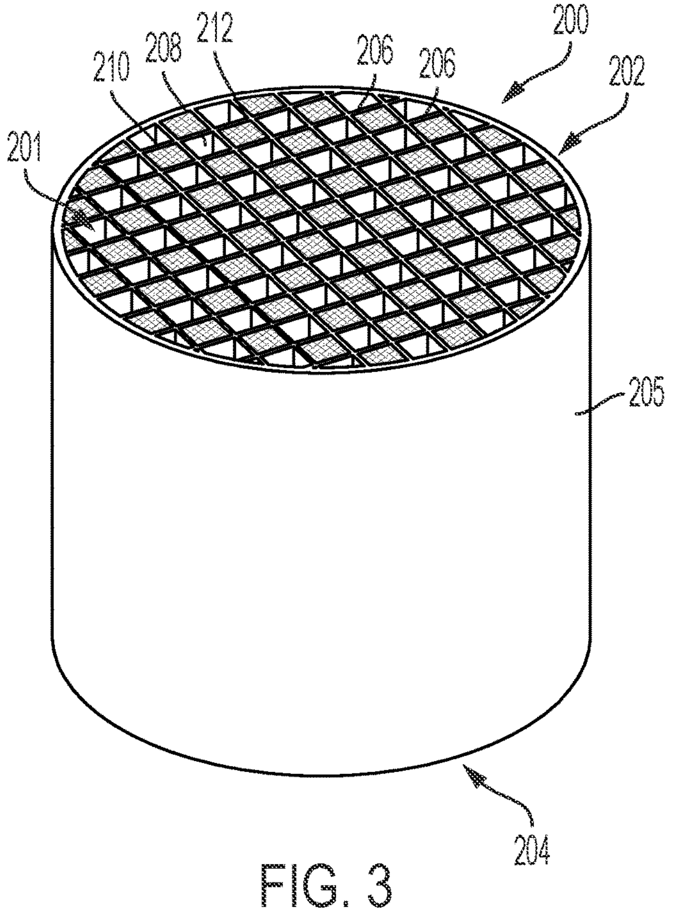
FIG. 3 schematically depicts a particulate filter according to embodiments disclosed and described herein.
Figure 4:
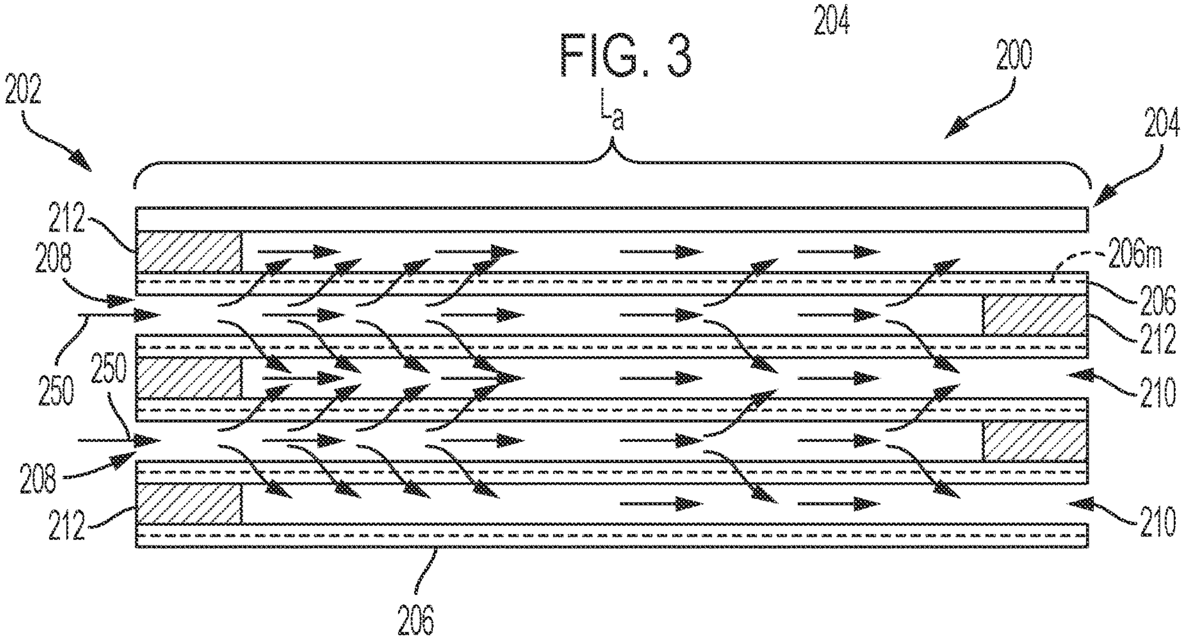
FIG. 4 is a cross-sectional longitudinal view of the particulate filter shown in FIG. 3.

Referring now to FIGS. 3-4, a honeycomb body in the form of a particulate filter 200 is schematically depicted. The particulate filter 200 may be used as a wall-flow filter to filter particulate matter from an exhaust gas stream 250, such as an exhaust gas stream emitted from a gasoline engine, in which case the particulate filter 200 is a gasoline particulate filter. The particulate filter 200 generally comprises a honeycomb body having a plurality of channels 201 or cells which extend between an inlet end 202 and an outlet end 204, defining an overall length $L_a$ (shown in FIG. 4). The channels 201 of the particulate filter 200 are formed by, and at least partially defined by a plurality of intersecting channel walls 206 that extend from the inlet end 202 to the outlet end 204. The particulate filter 200 may also include a skin layer 205 surrounding the plurality of channels 201. This skin layer 205 may be extruded during the formation of the channel walls 206 or formed in later processing as an after-applied skin layer, such as by applying a skinning cement to the outer peripheral portion of the channels.

A cross-sectional longitudinal view of the particulate filter 200 of FIG. 3 is shown in FIG. 4. In embodiments, certain channels are designated as inlet channels 208 and certain other channels are designated as outlet channels 210. In embodiments of the particulate filter 200, at least a first set of channels may be plugged with plugs 212. Generally, the plugs 212 are arranged proximate the ends (i.e., the inlet end or the outlet end) of the channels 201. The plugs are generally arranged in a pre-defined pattern, such as in the checkerboard pattern shown in FIG. 3, with every other channel being plugged at an end. The inlet channels 208 may be plugged at or near the outlet end 204, and the outlet channels 210 may be plugged at or near the inlet end 202 on channels not corresponding to the inlet channels, as depicted in FIG. 4. Accordingly, each cell may be plugged at or near one end of the particulate filter only. The intersecting channel walls 206 are porous such that the gas stream 250 flows through a thickness of the walls, as well as in an axial direction, and overall in the direction of the arrows, from inlet channels 208 to the outlet channels 210. The porous ceramic walls have an average wall thickness. A midpoint 206*m* is one-half of the average wall thickness.

While FIG. 3 generally depicts a checkerboard plugging pattern, it should be understood that alternative plugging patterns may be used in the porous ceramic honeycomb article. In the embodiments described herein, the particulate filter 200 may be formed with a channel density of up to about 600 channels per square inch (cpsi). For example, in embodiments, the particulate filter 100 may have a channel density in a range from about 100 cpsi to about 600 cpsi. In some other embodiments, the particulate filter 100 may have a channel density in a range from about 100 cpsi to about 400 cpsi or even from about 200 cpsi to about 300 cpsi.

In the embodiments described herein, the channel walls 206 of the particulate filter 200 may have a thickness of greater than about 4 mils (101.6 microns). For example, in embodiments, the thickness of the channel walls 206 may be in a range from about 4 mils up to about 30 mils (762 microns). In some other embodiments, the thickness of the channel walls 206 may be in a range from about 7 mils (177.8 microns) to about 20 mils (508 microns).

In embodiments of the particulate filter 200 described herein the channel walls 206 of the particulate filter 200 may have a bare open porosity (i.e., the porosity before any coating is applied to the honeycomb body) % P≥35% prior to the application of any coating to the particulate filter 200. In embodiments the bare open porosity of the channel walls 206 may be such that 40%≤% P≤75%. In other embodiments, the bare open porosity of the channel walls 206 may be such that 45%≤% P≤75%, 50%≤% P≤75%, 55%≤% P≤75%, 60%≤% P≤75%, 45%≤% P≤70%, 50%≤% P≤70%, 55%≤% P≤70%, or 60%≤% P≤70%.

Further, in embodiments, the channel walls 206 of the particulate filter 200 are formed such that the pore distribution in the channel walls 206 has a median pore size of ≤30 microns prior to the application of any coatings (i.e., bare). For example, in embodiments, the median pore size may be ≥8 microns and less than or ≤30 microns. In other embodiments, the median pore size may be ≥10 microns and less than or ≤30 microns. In other embodiments, the median pore size may be ≥10 microns and less than or ≤25 microns. In embodiments, particulate filters produced with a median pore size greater than about 30 microns have reduced filtration efficiency while with particulate filters produced with a median pore size less than about 8 microns may be difficult to infiltrate the pores with a washcoat containing a catalyst. Accordingly, in embodiments, it is desirable to maintain the median pore size of the channel wall in a range of from about 8 microns to about 30 microns, for example, in a range of rom 10 microns to about 20 microns.

In one or more embodiments described herein, the honeycomb body of the particulate filter 200 is formed from a metal or ceramic material such as, for example, cordierite, silicon carbide, aluminum oxide, aluminum titanate or any other ceramic material suitable for use in elevated temperature particulate filtration applications. For example, the particulate filter 200 may be formed from cordierite by mixing a batch of ceramic precursor materials which may include constituent materials suitable for producing a ceramic article which predominately comprises a cordierite crystalline phase. In general, the constituent materials suitable for cordierite formation include a combination of inorganic components including talc, a silica-forming source, and an alumina-forming source. The batch composition may additionally comprise clay, such as, for example, kaolin clay. The cordierite precursor batch composition may also contain organic components, such as organic pore formers, which are added to the batch mixture to achieve the desired pore size distribution. For example, the batch composition may comprise a starch which is suitable for use as a pore former and/or other processing aids. Alternatively, the constituent materials may comprise one or more cordierite powders suitable for forming a sintered cordierite honeycomb structure upon firing as well as an organic pore former material.

The batch composition may additionally comprise one or more processing aids such as, for example, a binder and a liquid vehicle, such as water or a suitable solvent. The processing aids are added to the batch mixture to plasticize the batch mixture and to generally improve processing, reduce the drying time, reduce cracking upon firing, and/or aid in producing the desired properties in the honeycomb body. For example, the binder can include an organic binder. Suitable organic binders include water soluble cellulose ether binders such as methylcellulose, hydroxypropyl methylcellulose, methylcellulose derivatives, hydroxyethyl acrylate, polyvinylalcohol, and/or any combinations thereof. Incorporation of the organic binder into the plasticized batch composition allows the plasticized batch composition to be readily extruded. In embodiments, the batch composition may include one or more optional forming or processing aids such as, for example, a lubricant which assists in the extrusion of the plasticized batch mixture. Exemplary lubricants can include tall oil, sodium stearate or other suitable lubricants.

After the batch of ceramic precursor materials is mixed with the appropriate processing aids, the batch of ceramic precursor materials is extruded and dried to form a green honeycomb body comprising an inlet end and an outlet end with a plurality of channel walls extending between the inlet end and the outlet end. Thereafter, the green honeycomb body is fired according to a firing schedule suitable for producing a fired honeycomb body. At least a first set of the channels of the fired honeycomb body are then plugged in a predefined plugging pattern with a ceramic plugging composition and the fired honeycomb body is again fired to cream the plugs and secure the plugs in the channels.

Figure 5A:
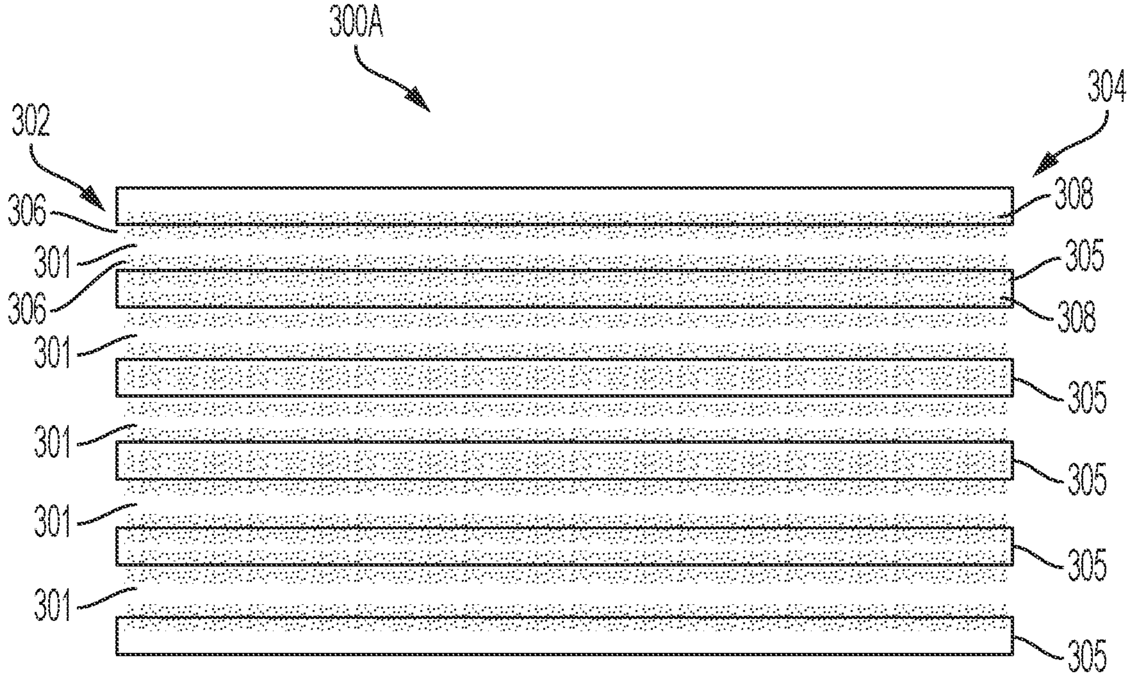
FIGS. 5A and 5B are cross-sectional longitudinal views of an article according to embodiments disclosed herein.

FIG. 5A is a cross-sectional longitudinal view of an article 300A according to embodiments disclosed herein. In one or more embodiments, the article 300A is effective for filtration of particulates from gaseous streams and/or for catalytically converting combustion by-products. In accordance with FIG. 5A, the configuration of magnetic susceptor material 306 and three-way conversion (TWC) catalytic material 308 can be applied to any honeycomb body having porous walls defining inner channels, e.g., flow-through substrates or wall flow particulate filters. The article 300A may be used as an article to treat an exhaust gas stream, such as an exhaust gas stream emitted from a gasoline engine, which enters the article at a first/inlet end 302 and travels through a plurality of channels 301 defined by walls 305 and exits at a second/outlet end 304. In this embodiment, the magnetic susceptor material 306 is on surfaces of the walls 305 in all of the channels 201. The TWC catalytic material 308 is in pores of the walls 305. There is separation between the magnetic susceptor material 306 and the TWC catalytic material 308.

Figure 5B:
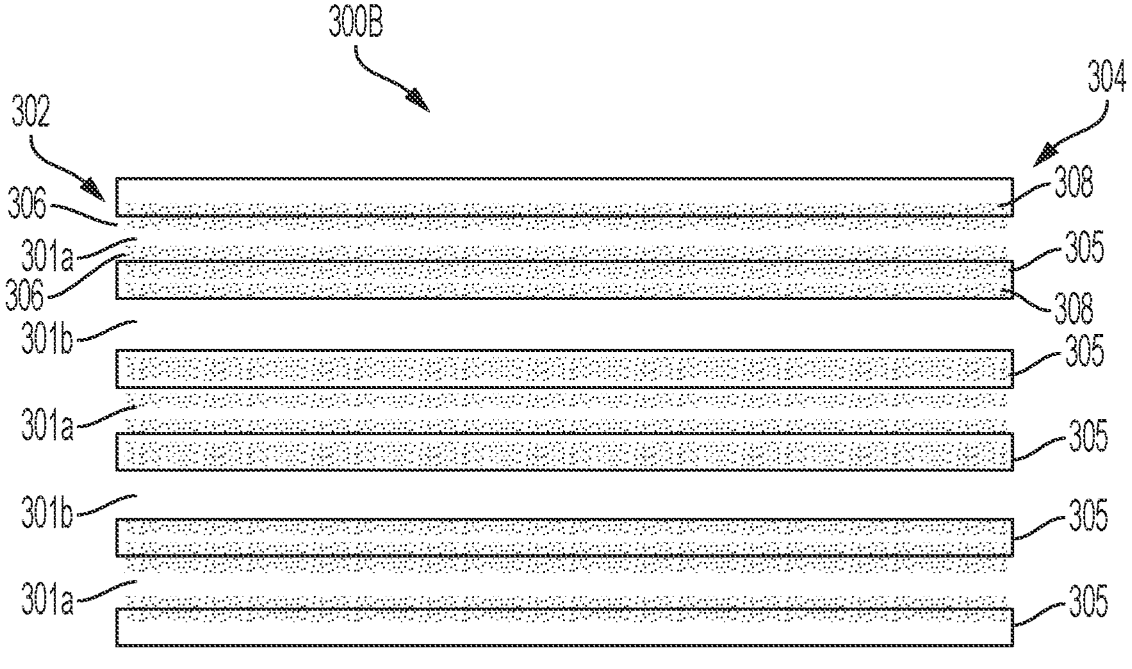

FIG. 5B is a cross-sectional longitudinal view of an article 300B according to embodiments disclosed herein. In one or more embodiments, the article 300B is effective for filtration of particulates from gaseous streams and/or for catalytically converting combustion by-products. In accordance with FIG. 5B, the configuration of magnetic susceptor material 306 and three-way conversion (TWC) catalytic material 308 can be applied to any honeycomb body having porous walls defining inner channels, e.g., flow-through substrates or wall flow particulate filters. The article 300B may be used as an article to treat an exhaust gas stream, such as an exhaust gas stream emitted from a gasoline engine, which enters the article at a first/inlet end 302 and travels through a first plurality of channels 301*a* and a second plurality of channels 301*b* defined by walls 305 and exits at a second/outlet end 304. In this embodiment, the magnetic susceptor material 306 is on surfaces of the walls 305 in the first plurality of channels 301*a* and is absent from the channels 301*b*. The TWC catalytic material 308 is in pores of the walls 305. There is separation between the magnetic susceptor material 306 and the TWC catalytic material 308.

Figure 6:
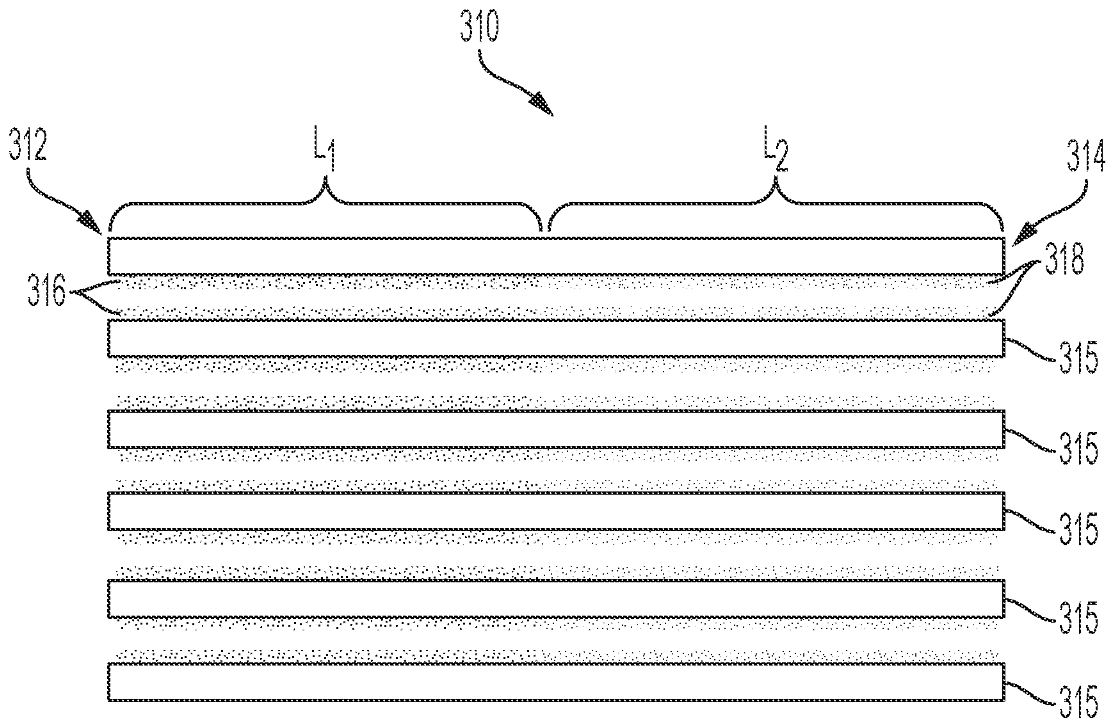
FIG. 6 is a cross-sectional longitudinal view of an article according to embodiments disclosed herein.

FIG. 6 is a cross-sectional longitudinal view of an article 310 according to embodiments disclosed herein. In one or more embodiments, the article 310 is effective for filtration of particulates from gaseous streams and/or for catalytically converting combustion by-products. In accordance with FIG. 6, the configuration of magnetic susceptor material 316 and three-way conversion (TWC) catalytic material 318 can be applied to any honeycomb body having porous walls defining inner channels, e.g., flow-through substrates or wall flow particulate filters. The article 310 may be used as an article to treat an exhaust gas stream, such as an exhaust gas stream emitted from a gasoline engine, which enters the article at a first/inlet end 312 and travels through a plurality of channels defined by walls 315 and exits at a second/outlet end 314. In this embodiment, the magnetic susceptor material 316 is on surfaces of the walls 315, extending a first axial distance $L_1$. The TWC catalytic material 318 is on surfaces of the walls 315, extending a second axial distance $L_2$. Accordingly, there is separation between the magnetic susceptor material 306 and the TWC catalytic material 308. It is understood for an embodiment where there is axial separation, the magnetic susceptor material 316 may be located both on surfaces of the walls 315 and in the pores; and similarly, the TWC catalytic material 318 may be located both on surfaces of the walls 315 and in the pores, so long as the axial separation is maintained. The axial distances can be expressed as a percentage of the entire axial length, such that a sum of $L_1$ plus $L_2$ is equal to 100%. The value of $L_1$ can range from 1% to 99%, and likewise the value of $L_2$ can range from 99% to 1%, including all values and subranges therebetween.

Figure 7:
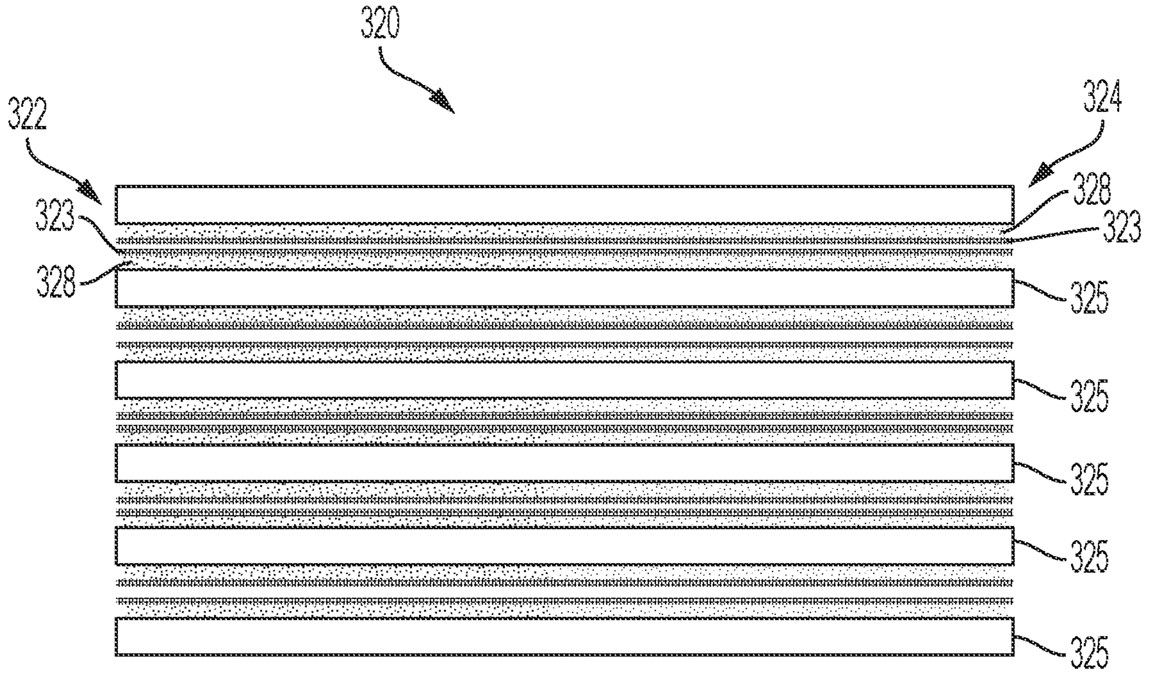
FIG. 7 a cross-sectional schematic view of a core-shell particle according to embodiments disclosed herein.

FIG. 7 is a cross-sectional longitudinal view of an article 320 according to embodiments disclosed herein. In one or more embodiments, the article 320 is effective for filtration of particulates from gaseous streams and/or for catalytically converting combustion by-products. In accordance with FIG. 7, the configuration of core-shell nanoparticles comprising magnetic susceptor material 323, and three-way conversion (TWC) catalytic material 328 can be applied to any honeycomb body having porous walls defining inner channels, e.g., flow-through substrates or wall flow particulate filters. The article 320 may be used as an article to treat an exhaust gas stream, such as an exhaust gas stream emitted from a gasoline engine, which enters the article at a first/inlet end 322 and travels through a plurality of channels defined by walls 325 and exits at a second/outlet end 324. In this embodiment, the magnetic susceptor material is in a core of core-shell nanoparticles 323, which are above and/or on surfaces of the walls 325. The TWC catalytic material 328 is on surfaces of the walls 325, or even within pores of the walls 325. There is separation between the magnetic susceptor material and the TWC catalytic material 328 by the shells of the nanoparticles. It is understood for an embodiment using core-shell nanoparticles, where the magnetic susceptor material is encapsulated in a protective shell, the TWC catalytic material 328 may be located both on surfaces of the walls 325 and in the pores, and in contact with shells of the core-shell nanoparticles.

Figure 8:
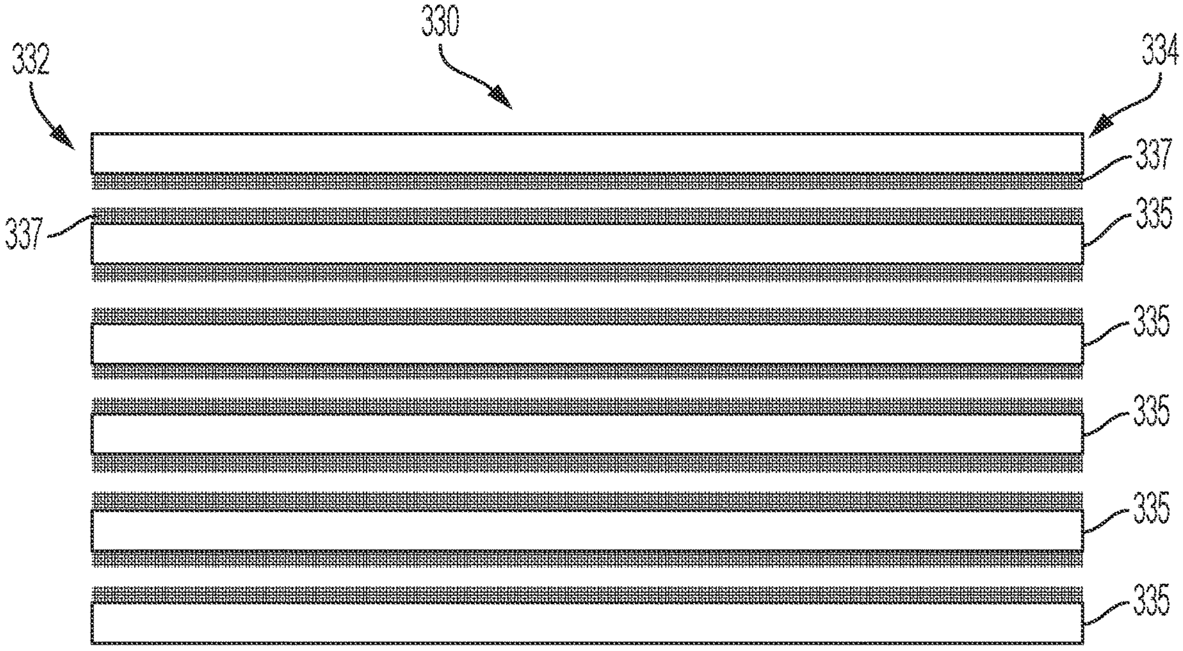
FIG. 8 is a axial cross-sectional longitudinal view of an article according to embodiments disclosed herein.
Figure 9:
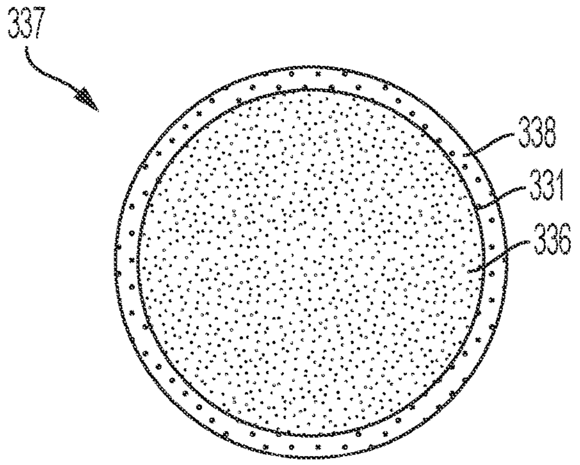
FIG. 9 is a axial cross-sectional longitudinal view of an article according to embodiments disclosed herein.

FIG. 8 is a cross-sectional longitudinal view of an article 330 according to embodiments disclosed herein. In one or more embodiments, the article 330 is effective for filtration of particulates from gaseous streams and/or for catalytically converting combustion by-products. With reference to FIG. 9, a coated core-shell nanoparticle 337 comprises a magnetic susceptor material 336 in a core encapsulated by a shell 331, and three-way conversion (TWC) catalytic material 338 coats the core-shell nanoparticles. In one or more embodiments, wherein the magnetic susceptor material is disposed separate from the catalytic material by the shell. In accordance with FIG. 8, the configuration of coated core-shell nanoparticles 337 comprising magnetic susceptor material in a core encapsulated by a shell, and three-way conversion (TWC) catalytic material coating the core-shell nanoparticles can be applied to any honeycomb body having porous walls defining inner channels, e.g., flow-through substrates or wall flow particulate filters. With further reference to FIG. 8, the article 330 may be used as an article to treat an exhaust gas stream, such as an exhaust gas stream emitted from a gasoline engine, which enters the article at a first/inlet end 332 and travels through a plurality of channels defined by walls 335 and exits at a second/outlet end 334. In this embodiment, the magnetic susceptor material is in a core of coated core-shell nanoparticles 337, which are above and/or on surfaces and/or within the walls 335. The TWC catalytic material coats the coated core-shell nanoparticles 337. There is separation between the magnetic susceptor material and the TWC catalytic material by the shells of the nanoparticles.

Figure 10:
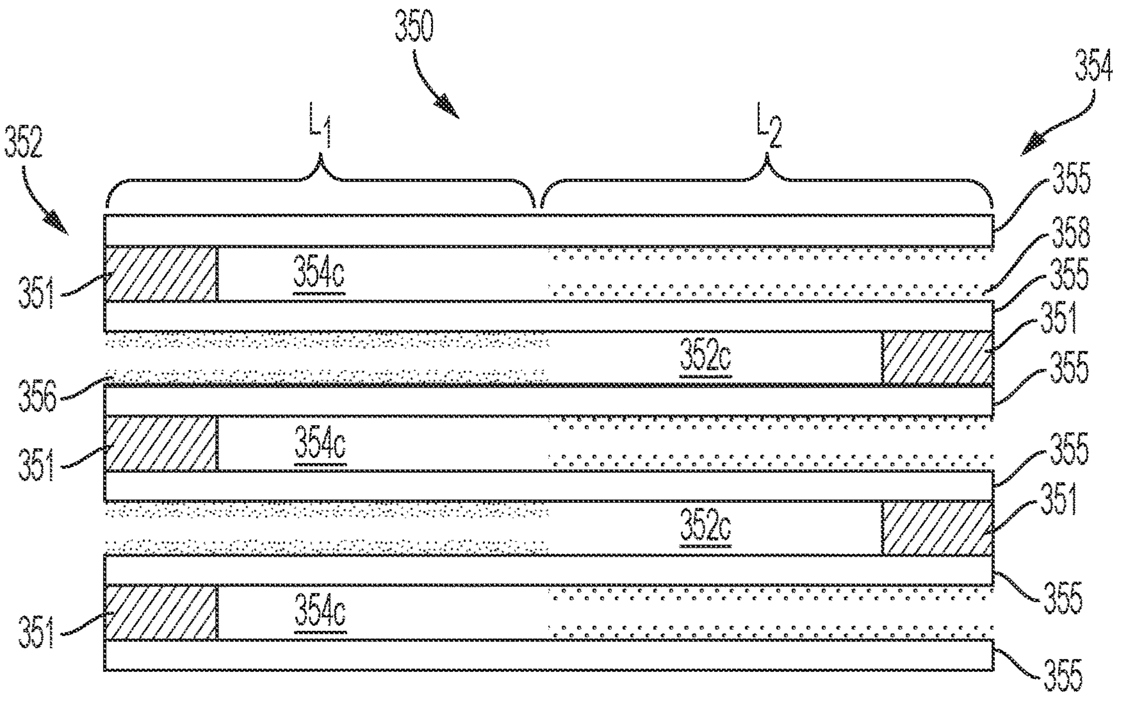
FIG. 10 is a cross-sectional longitudinal view of an article according to embodiments disclosed herein.

FIG. 10 is a cross-sectional longitudinal view of an article 350 according to embodiments disclosed herein. In one or more embodiments, the article 350 is effective for filtration of particulates from gaseous streams and/or for catalytically converting combustion by-products. In accordance with FIG. 10, the configuration of magnetic susceptor material 356 and three-way conversion (TWC) catalytic material 358 is specific to wall flow particulate filters, which have inlet channels which are plugged at a distal end of the plugged honeycomb filter body and outlet channels which are plugged at a proximal end of the plugged honeycomb filter body. The article 350 may be used as an article to treat an exhaust gas stream, such as an exhaust gas stream emitted from a gasoline engine, which enters the article at a first/inlet end 352 and travels along a plurality of inlet channels **352*c*, through walls 355, and exits along a plurality of outlet channels 354*c* at a second/outlet end 354. The article 350 includes a first set of channels (e.g., inlet channels defining an inlet side of the article) 352*c* that are plugged with plugs 351 at the second/outlet end 354. The article 350 includes a second set of channels (e.g., outlet channels defining an outlet side of the article) 354*c* that are plugged with plugs 351 at the first/inlet end 352. In this embodiment, the magnetic susceptor material 356 is on surfaces of the walls 355, extending a first axial distance $L_1$ of the inlet channels 352*c*. The TWC catalytic material 358 is on surfaces of the walls 355, extending a second axial distance $L_2$ of the outlet channels 354*c*. Accordingly, there is both axial separation between the magnetic susceptor material 356 and the TWC catalytic material 358 and lateral separation based on being on different sides of the walls 355. It is understood for this embodiment that the magnetic susceptor material 356 may be located both on surfaces of the walls 355 and in the pores; and similarly, the TWC catalytic material 358 may be located both on surfaces of the walls 355 and in the pores. Moreover, another embodiment understood from FIG. 10 is one where the magnetic susceptor material 356 is on surfaces of the walls 355, extending the first axial distance $L_1$ of the outlet channels 354*c*, and the TWC catalytic material 358 is on surfaces of the walls 355, extending the second axial distance $L_2$ of the inlet channels 352*c***. The axial distances can be expressed as a percentage of the entire axial length, such that a sum of $L_1$ plus $L_2$ is equal to 100%. The value of $L_1$ can range from 1% to 99%, and likewise the value of $L_2$ can range from 99% to 1%, including all values and subranges there between.

Figure 11:
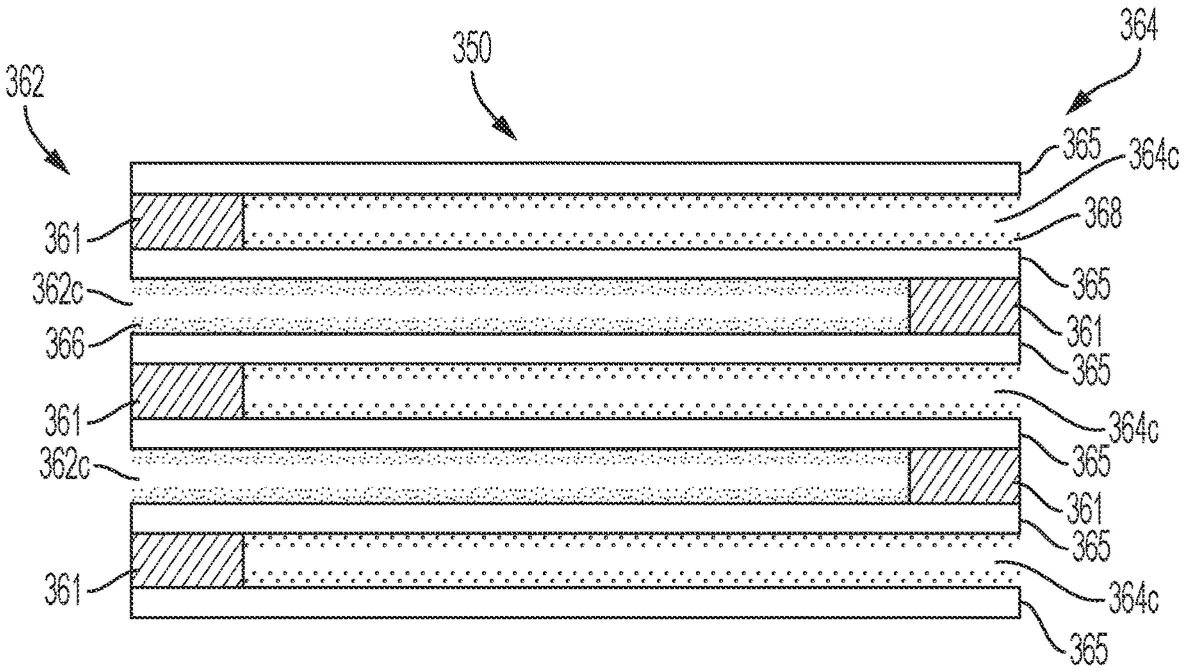
FIG. 11 is a cross-sectional longitudinal view of an article according to embodiments disclosed herein.

FIG. 11 is a cross-sectional longitudinal view of an article 360 according to embodiments disclosed herein. In one or more embodiments, the article 360 is effective for filtration of particulates from gaseous streams and/or for catalytically converting combustion by-products. In accordance with FIG. 11, the configuration of magnetic susceptor material 366 and three-way conversion (TWC) catalytic material 368 is specific to wall flow particulate filters, which have inlet channels which are plugged at a distal end of the plugged honeycomb filter body and outlet channels which are plugged at a proximal end of the plugged honeycomb filter body. The article 360 may be used as an article to treat an exhaust gas stream, such as an exhaust gas stream emitted from a gasoline engine, which enters the article at a first/inlet end 362 and travels along a plurality of inlet channels **362*c*, through walls 365, and exits along a plurality of outlet channels 364*c* at a second/outlet end 364. The article 360 includes a first set of channels (e.g., inlet channels defining an inlet side of the article) 362*c* that are plugged with plugs 361 at the second/outlet end 364. The article 360 includes a second set of channels (e.g., outlet channels defining an outlet side of the article) 364*c* that are plugged with plugs 361 at the first/inlet end 362. In this embodiment, the magnetic susceptor material 366 is on surfaces of the walls 365 of the inlet channels 362*c* The TWC catalytic material 368 is on surfaces of the walls 365 of the outlet channels 364*c*. Accordingly, there is lateral separation between the magnetic susceptor material 366 and the TWC catalytic material 368 based on being on different sides of the walls 365. It is understood for this embodiment that the magnetic susceptor material 366 may be located both on surfaces of the walls 355 and in the pores of one side of the article. Similarly, the TWC catalytic material 368 may be located both on surfaces of the walls 355** and in the pores on the other side of the article.

Figure 12:
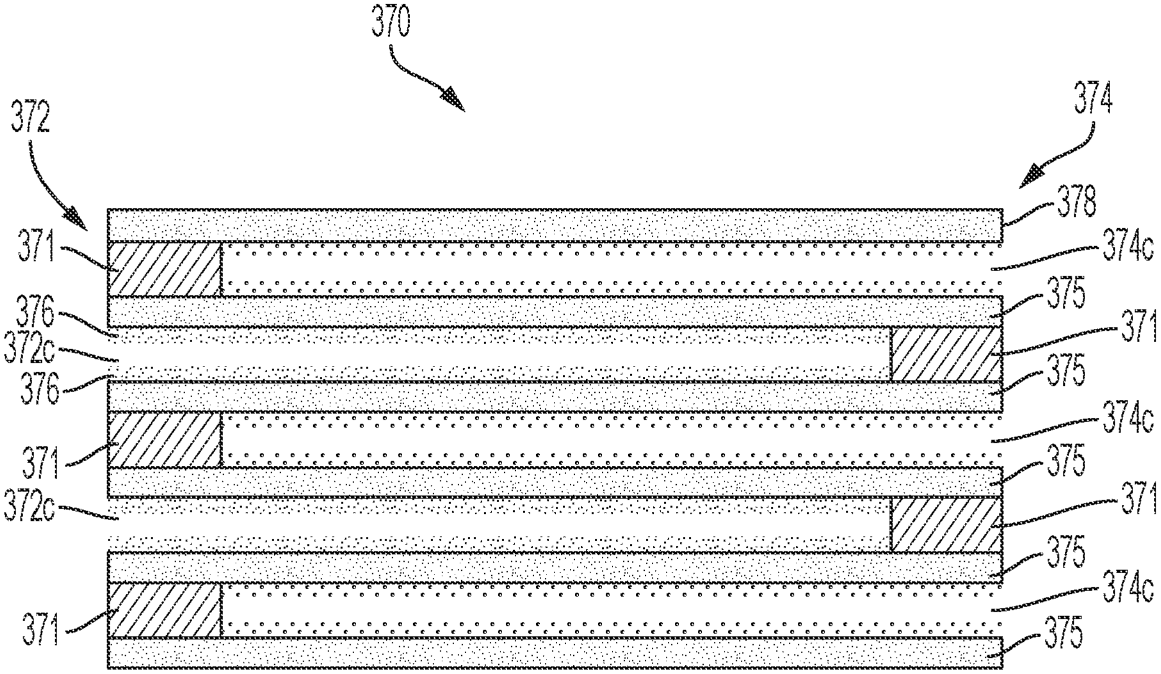
FIG. 12 is a cross-sectional longitudinal view of an article according to embodiments disclosed herein.

FIG. 12 is a cross-sectional longitudinal view of an article 370 according to embodiments disclosed herein. In one or more embodiments, the article 370 is effective for filtration of particulates from gaseous streams and/or for catalytically converting combustion by-products. In accordance with FIG. 12, the configuration of magnetic susceptor material 376 and three-way conversion (TWC) catalytic material 378 is specific to wall flow particulate filters, which have inlet channels which are plugged at a distal end of the plugged honeycomb filter body and outlet channels which are plugged at a proximal end of the plugged honeycomb filter body. The article 370 may be used as an article to treat an exhaust gas stream, such as an exhaust gas stream emitted from a gasoline engine, which enters the article at a first/inlet end 372 and travels along a plurality of inlet channels **372*c*, through walls 375, and exits along a plurality of outlet channels 374*c* at a second/outlet end 374. The article 370 includes a first set of channels (e.g., inlet channels defining an inlet side of the article) 372*c* that are plugged with plugs 371 at the second/outlet end 374. The article 370 includes a second set of channels (e.g., outlet channels defining an outlet side of the article) 374*c* that are plugged with plugs 371 at the first/inlet end 372. In this embodiment, the magnetic susceptor material 376 is on surfaces of the walls 375 of the inlet channels 372***c*. The TWC catalytic material 378 is in pores of the walls 375. Accordingly, there is separation between the magnetic susceptor material 376 and the TWC catalytic material 378. In one or more embodiments, this separation is achieved by filling a portion of the wall pores with a filler, such as carbon soot after deposition of the catalytic material and prior to deposition of the magnetic susceptor material, so that the magnetic susceptor material is deposited only on-wall. The soot is burned off thereafter. It is understood for this embodiment that the magnetic susceptor material 376 may alternatively or in addition to be located on surfaces of the walls 375 of the outlet channels 374*c*.

Figure 13:
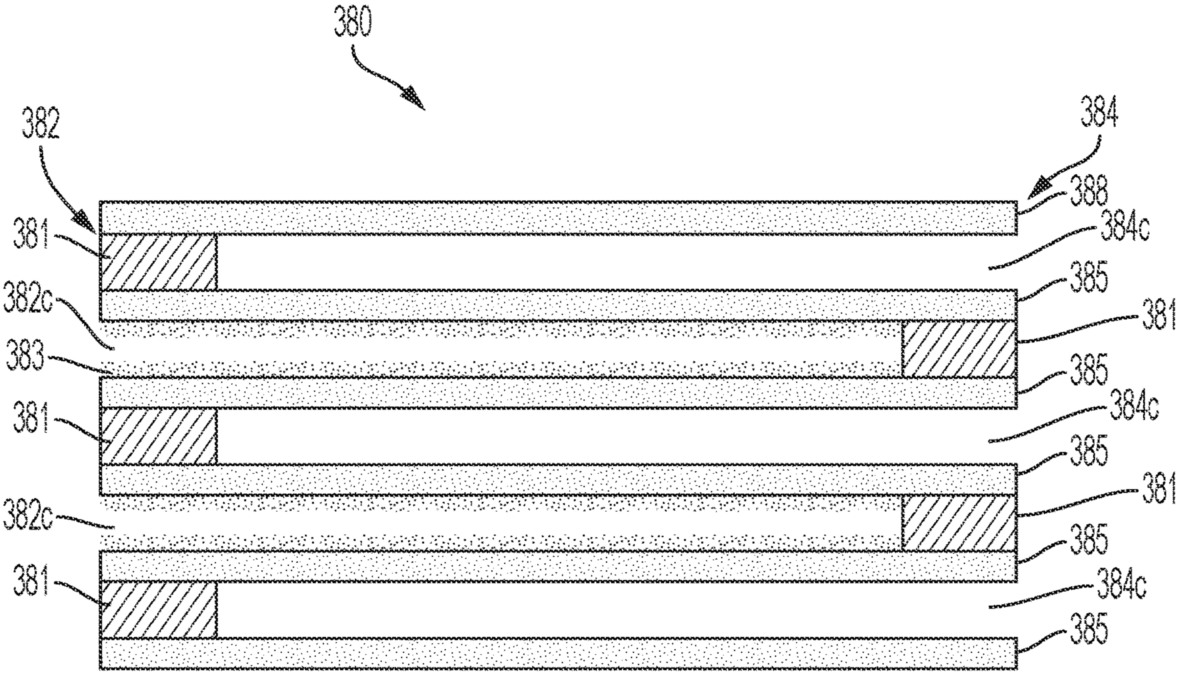
FIG. 13 is a cross-sectional longitudinal view of an article according to embodiments disclosed herein.

FIG. 13 is a cross-sectional longitudinal view of an article 380 according to embodiments disclosed herein. In one or more embodiments, the article 380 is effective for filtration of particulates from gaseous streams and/or for catalytically converting combustion by-products. In accordance with FIG. 13, the configuration of core-shell nanoparticles comprising magnetic susceptor material 383, and three-way conversion (TWC) catalytic material 388 is specific to wall flow particulate filters, which have inlet channels which are plugged at a distal end of the plugged honeycomb filter body and outlet channels which are plugged at a proximal end of the plugged honeycomb filter body. The article 380 may be used as an article to treat an exhaust gas stream, such as an exhaust gas stream emitted from a gasoline engine, which enters the article at a first/inlet end 382 and travels along a plurality of inlet channels 382*c*, through walls 385, and exits along a plurality of outlet channels 384*c* at a second/outlet end 384. The article 380 includes a first set of channels (e.g., inlet channels defining an inlet side of the article) 382*c* that are plugged with plugs 381 at the second/outlet end 384. The article 380 includes a second set of channels (e.g., outlet channels defining an outlet side of the article) 384*c* that are plugged with plugs 381 at the first/inlet end 382. In this embodiment, the magnetic susceptor material is in a core of core-shell nanoparticles 383, which hare analogous to core-shell nanoparticles 323, which are above and/or on surfaces of the walls 385. The TWC catalytic material 388 is within pores of the walls 355. In There is separation between the magnetic susceptor material and the TWC catalytic material 328 by the shells of the nanoparticles. It is understood for an embodiment using core-shell nanoparticles, where the magnetic susceptor material is encapsulated in a protective shell, the TWC catalytic material 388 may be located both on surfaces of the walls 385 and in the pores, and in contact with shells of the core-shell nanoparticles 383. It is understood for this embodiment that the magnetic susceptor-containing core-shell nanoparticles 383 may alternatively or in addition to be located on surfaces of the walls 385 of the outlet channels 384*c*.

Figure 14:
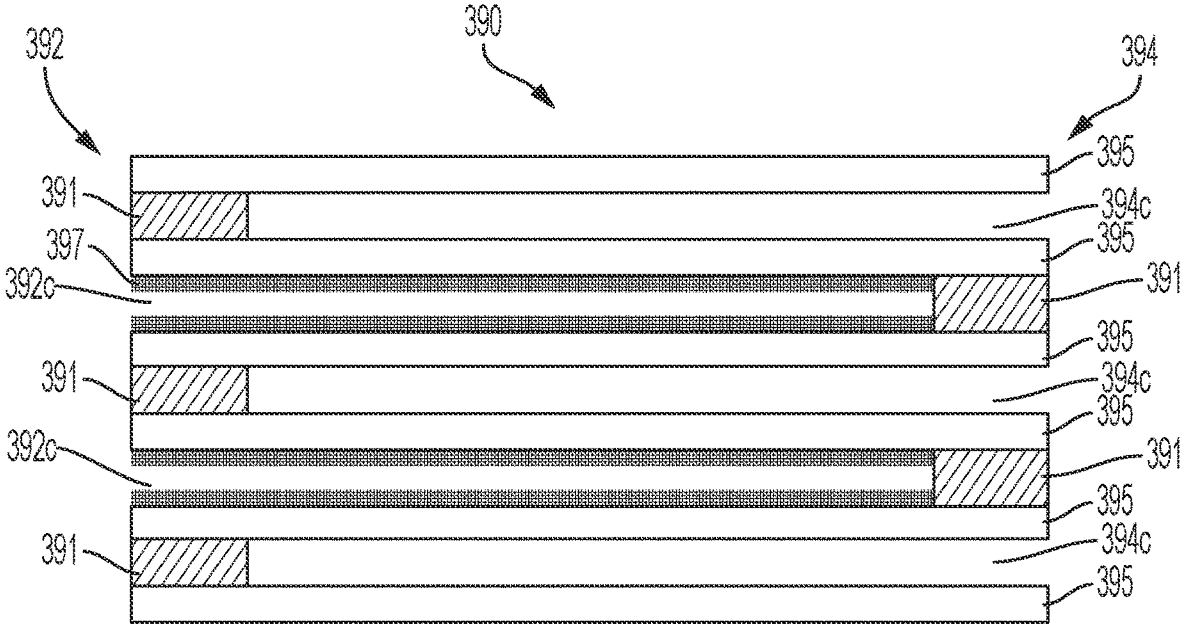
FIG. 14 is a cross-sectional longitudinal view of an article according to embodiments disclosed herein.

FIG. 14 is a cross-sectional longitudinal view of an article 390 according to embodiments disclosed herein. In one or more embodiments, the article 390 is effective for filtration of particulates from gaseous streams and/or for catalytically converting combustion by-products. A coated core-shell nanoparticle 397, analogous to coated core-shell nanoparticle 397 of FIGS. 8-9, comprises a magnetic susceptor material in a core encapsulated by a shell, and three-way conversion (TWC) catalytic material coats the core-shell nanoparticles. In accordance with FIG. 14, the configuration of coated core-shell nanoparticles 397 comprising magnetic susceptor material in a core encapsulated by a shell, and three-way conversion (TWC) catalytic material coating the core-shell nanoparticles is specific to wall flow particulate filters, which have inlet channels which are plugged at a distal end of the plugged honeycomb filter body and outlet channels which are plugged at a proximal end of the plugged honeycomb filter body. The article 390 may be used as an article to treat an exhaust gas stream, such as an exhaust gas stream emitted from a gasoline engine, which enters the article at a first/inlet end 392 and travels along a plurality of inlet channels 392*c*, through walls 395, and exits along a plurality of outlet channels 394*c* at a second/outlet end 394. The article 390 includes a first set of channels (e.g., inlet channels defining an inlet side of the article) 392*c* that are plugged with plugs 391 at the second/outlet end 394. The article 390 includes a second set of channels (e.g., outlet channels defining an outlet side of the article) 394*c* that are plugged with plugs 391 at the first/inlet end 392. In this embodiment, the magnetic susceptor material is in a core of coated core-shell nanoparticles 397, which are above and/or on surfaces and/or within the walls 395. The TWC catalytic material coats the coated core-shell nanoparticles 397. There is separation between the magnetic susceptor material and the TWC catalytic material by the shells of the nanoparticles. It is understood for this embodiment that the magnetic susceptor-containing coated core-shell nanoparticles 397 may alternatively or in addition to be located on or in surfaces of the walls 395 of the outlet channels 394*c*.

Figure 16:
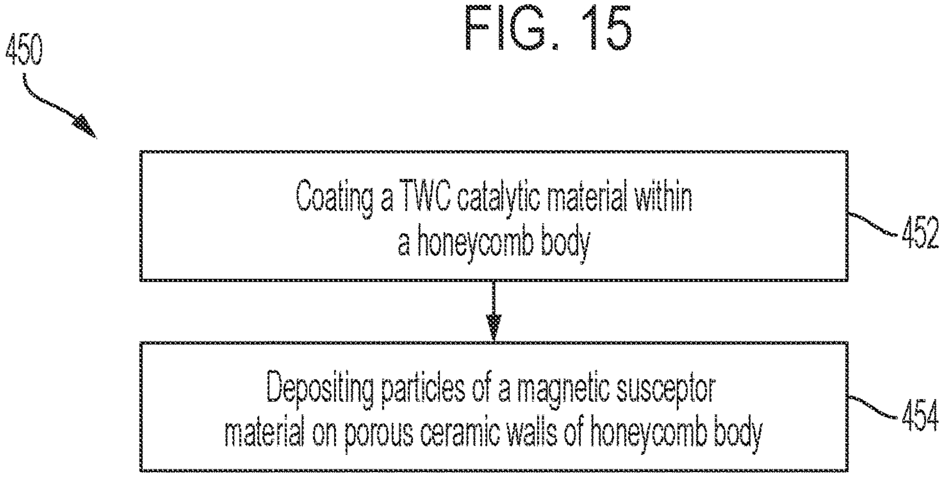
FIG. 16 is a flowchart depicting an exemplary embodiment of a process of preparing an emissions treatment article according to embodiments disclosed herein.

Generally, with respect to FIG. 16, a method 450 for preparing emissions treatment articles herein, including filtration articles having catalytic material, comprises: an operation 452 of coating a TWC catalytic material within a honeycomb body, and an operation 454 of depositing particles of a magnetic susceptor material on one or more portions of porous ceramic walls of honeycomb body.

In various embodiments, the magnetic susceptor material is effective to filter particulate matter from a gas stream, for example, an exhaust gas stream from a gasoline engine. Accordingly, the median pore size, porosity, geometry and other design aspects of both the bulk and the surface of the honeycomb body are selected taking into account these filtration requirements of the honeycomb body. Particles of the magnetic susceptor material that are deposited on the wall of the honeycomb body and help prevent particulate matter, such as, for example, soot and ash, from exiting the honeycomb body and to help prevent the particulate matter from clogging the base portion of the walls of the honeycomb body. In this way, and according to embodiments, the magnetic susceptor material can serve as a primary filtration component while the porous ceramic walls of the honeycomb body can be configured to otherwise minimize pressure drop for example as compared to conventional honeycomb bodies without such layer. As will be described in further detail herein, the layer may be formed by a suitable method, such as, for example, an aerosol deposition method. Aerosol deposition enables the formation of a thin, porous layer at least some surfaces of the walls of the honeycomb body.

According to one or more embodiments, a process is provided which includes forming an aerosol with a binder process, which is deposited on a honeycomb body to provide a high filtration efficiency material, which may be an inorganic layer, on the honeycomb body to provide a gasoline particulate filter. According to one or more embodiments, the process can include the steps of solution preparation, atomization, drying, and deposition of material on the walls of a wall flow filter and curing. Deposits of magnetic susceptor having a high mechanical integrity can be formed without any sintering steps (e.g., heating to temperatures in excess of 1000° C.) by aerosol deposition with binder.

Figure 15:
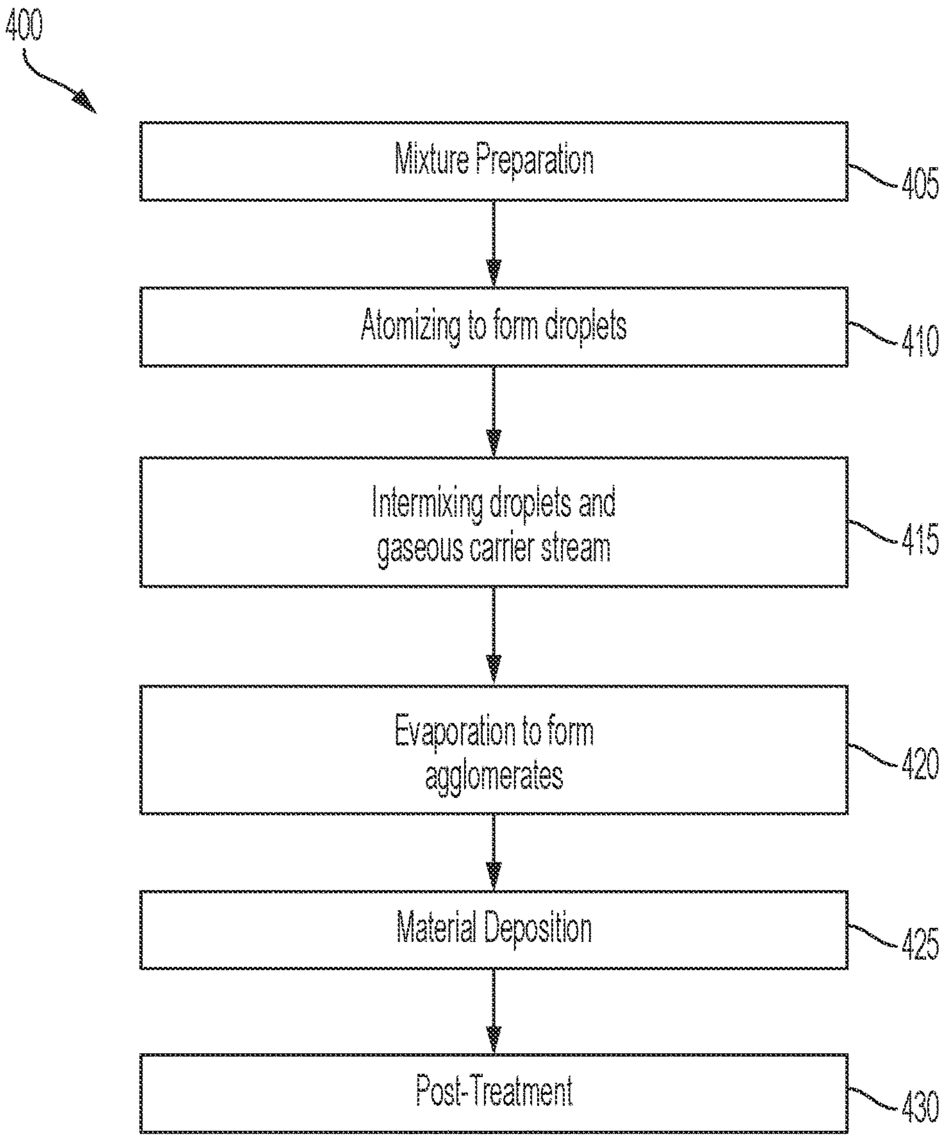
FIG. 15 is a flowchart depicting an exemplary embodiment of a process of forming deposits of magnetic susceptor material on a substrate according to embodiments disclosed herein.

According to one or more embodiments, an exemplary process flow 400 according to FIG. 15 for coating particles of a magnetic susceptor material on one or more portions of porous ceramic walls of honeycomb body according to FIG. 16 operation 454 includes: mixture preparation 405, atomizing to form droplets 410, intermixing droplets and a gaseous carrier stream 415; evaporating liquid vehicle to form agglomerates 420, depositing of material, e.g., agglomerates, on the walls of a wall-flow filter 425, and optional post-treatment 430 to, for example, bind the material on, or in, or both on and in, the porous walls of the honeycomb body. Aerosol deposition methods form of agglomerates comprising a binder can provide a high mechanical integrity even without any high temperature curing steps (e.g., heating to temperatures in excess of 1000° C.), and in embodiments even higher mechanical integrity after a curing step such as a high temperature (e.g., heating to temperatures in excess of 1000° C.) curing step.

Mixture preparation 405. Commercially available magnetic susceptor materials can be used as a raw material in a mixture for depositing. According to one or more embodiments, the particles comprise ferromagnetic or ferrimagnetic metals such as iron, cobalt, nickel or their alloys or oxides, and combinations thereof. In one or more embodiments, the mixture is a suspension. The particles may be supplied as a raw material suspended in a liquid vehicle to which a further liquid vehicle is optionally added.

In embodiments, the suspension is aqueous-based, and in other embodiments, the suspension is organic-based, for example, an alcohol such as ethanol or methanol.

The solution is formed using a solvent which is added to dilute the suspension if needed. Decreasing the solids content in the solution could reduce the aggregate size proportionally if the droplet generated by atomizing has similar size. The solvent should be miscible with suspension mentioned above, and be a solvent for binder and other ingredients.

A binder is optionally added to reinforce the material, which comprise inorganic binder, to provide mechanical integrity to deposited material. The binder provides binding strength between particles at elevated temperature (>500° C.). The starting material can be organic. After exposure to high temperature in excess of about 150° C., the organic will decompose or react with moisture and oxygen in the air. Suitable binders include but are not limited to alkoxy-siloxane resins. In one or more embodiments, the alkoxy-siloxane resins are reactive during processing. An exemplary reactive alkoxy-siloxane resin (methoxy functional) prior to processing has a specific gravity of 1.1 at 25° C. Another exemplary reactive alkoxy-siloxane resin (methyl-methoxy functional) prior to processing has a specific gravity of 1.155 at 25° C.

Catalyst can be added to accelerate the cure reaction of binder. A catalyst that can be used to accelerate the cure reaction of reactive alkoxy-siloxane resins is titanium butoxide.

Atomizing to form droplets 410. The mixture is atomized into fine droplets by high pressure gas through a nozzle. One example of the nozzle is 1/4J-SS+SU11-SS from Spraying Systems Co. This setup is comprised of a nozzle body along with fluid cap 2050 and air cap 67147. The atomizing gas can contribute to breaking up the liquid-particulate-binder stream into the droplets. The pressure of the atomizing gas is in the range of 20 psi to 150 psi. The pressure of the liquid is in the range of 1 to 100 psi. The average droplet size according to one or more embodiments is in the range of from 1 micron to 40 microns, for example, in a range of from 5 microns to 10 microns. The droplet size can be adjusted by adjusting the surface tension of the solution, viscosity of the solution, density of the solution, gas flow rate, gas pressure, liquid flow rate, liquid pressure, and nozzle design. In one or more embodiments, the atomizing gas comprises air, nitrogen or mixture thereof. In specific embodiments, the atomizing gas and the apparatus does not comprise air.

Intermixing droplets and gaseous carrier stream 415. The droplets are conveyed toward the honeycomb body by a gaseous carrier stream. In one or more embodiments, the gaseous carrier stream comprises a carrier gas and the atomizing gas. In one or more embodiments, at least a portion of the carrier gas contacts the atomizing nozzle. In one or more embodiments, substantially all of the liquid vehicle is evaporated from the droplets to form agglomerates comprised of the particles and the binder material.

In one or more embodiments, the gaseous carrier stream is heated prior to being mixed with the droplets. In one or more embodiments, the gaseous carrier stream is at a temperature in the range of from greater than or equal to 50° C. to less than or equal to 500° C., including all greater than or equal to 80° C. to less than or equal to 300° C., greater than or equal to 50° C. to less than or equal to 150° C., and all values and subranges therebetween. Operationally, temperature can be chosen to at least evaporate solvent of the mixture or suspension so long as the final temperature is above the dew point. As non-limiting example, ethanol can be evaporated at a low temperature. Without being held to theory, it is believed that an advantage of a higher temperature is that the droplets evaporate faster and when the liquid is largely evaporated, they are less likely to stick when they collide. In certain embodiments, smaller agglomerates contribute to better filtration material deposits formation. Furthermore, it is believed that if droplets collide but contain only a small amount of liquid (such as only internally), the droplets may not coalesce to a spherical shape. In embodiments, non-spherical agglomerates may provide desirable filtration performance.

Evaporation to Form Agglomerates 420. To avoid liquid capillary force impact which may form non-uniform material which may result in high pressure drop penalty, the droplets are dried in an evaporation section of the apparatus, forming dry solid agglomerates, which may be referred to as secondary particles, or "microparticles" which are made up of primary nanoparticles and binder-type material. The liquid vehicle, or solvent, is evaporated and passes through the honeycomb body in a gaseous or vapor phase so that liquid solvent residual or condensation is minimized during material deposition. When the agglomerate is carried into the honeycomb body by gas flow, the residual liquid in the inorganic material should be less than 10 wt %. All liquid is preferably evaporated as a result of the drying and are converted into a gas or vapor phase. The liquid residual could include solvent in the mixture (such as ethanol in the examples), or water condensed from the gas phase. Binder is not considered as liquid residual, even if some or all of the binder may be in liquid or otherwise non-solid state before cure. In one or more embodiments, a total volumetric flow through the chamber is greater than or equal to 5 $Nm^3$/hour and/or less than or equal to 200 $Nm^3$/hour; including greater than or equal to 20 $Nm^3$/hour and/or less than or equal to 100 $Nm^3$/hour; and all values and subranges therebetween. Higher flow rates can deposit more material than lower flow rates. Higher flow rates can be useful as larger cross-sectional area filters are to be produced. Larger cross-sectional area filters may have applications in filter systems for building or outdoor filtration systems.

Deposition in honeycomb body 425. The secondary particles or agglomerates of the primary particles are carried in gas flow, and the secondary particles or agglomerates, and/or aggregates thereof, are deposited on inlet wall surfaces of the honeycomb body when the gas passes through the honeycomb body. In one or more embodiments, the agglomerates and/or aggregates thereof are deposited onto the porous walls of the plugged honeycomb body. The deposited agglomerates may be disposed on, or in, or both on and in, the porous walls. In one or more embodiments, the plugged honeycomb body comprises inlet channels which are plugged at a distal end of the honeycomb body, and outlet channels which are plugged at a proximal end of the honeycomb body. In one or more embodiments, the agglomerates and/or aggregates thereof are deposited on, or in, or both on and in, the walls defining the inlet channels.

The flow can be driven by a fan, a blower or a vacuum pump. Additional air can be drawn into the system to achieve a desired flow rate. A desired flow rate is in the range of 5 to 200 $m^3$/hr.

One exemplary honeycomb body is suitable for use as a gasoline particular filter (GPF), and has the following non-limiting characteristics: diameter of 4.055 inches (10.3 cm), length of 5.47 inches (13.9 cm), cells per square inch (CPSI) of 200, wall thickness of 8 mils (203 microns), and average pore size of 14 μm.

In one or more embodiments, the average diameter of the secondary particles or agglomerates is in a range of from 300 nm micron to 10 microns, 300 nm to 8 microns, 300 nm micron to 7 microns, 300 nm micron to 6 microns, 300 nm micron to 5 microns, 300 nm micron to 4 microns, or 300 nm micron to 3 microns. In specific embodiments, the average diameter of the secondary particles or agglomerates is in the range of 1.5 microns to 3 microns, including about 2 microns. The average diameter of the secondary particles or agglomerates can be measured by a scanning electron microscope.

In one or more embodiments, the average diameter of the secondary particles or agglomerates is in a range of from 300 nm to 10 microns, 300 nm to 8 microns, 300 nm to 7 microns, 300 nm to 6 microns, 300 nm to 5 microns, 300 nm to 4 microns, or 300 nm to 3 microns, including the range of 1.5 microns to 3 microns, and including about 2 microns, and there is a ratio in the average diameter of the secondary particles or agglomerates to the average diameter of the primary particles of in range of from about 2:1 to about 67:1; about 2:1 to about 9:1; about 2:1 to about 8:1; about 2:1 to about 7:1; about 2:1 to about 6:1; about 2:1 to about 5:1; about 3:1 to about 10:1; about 3:1 to about 9:1; about 3:1 to about 8:1; about 3:1 to about 7:1; about 3:1 to about 6:1; about 3:1 to about 5:1; about 4:1 to about 10:1; about 4:1 to about 9:1; about 4:1 to about 8:1; about 4:1 to about 7:1; about 4:1 to about 6:1; about 4:1 to about 5:1; about 5:1 to about 10:1; about 5:1 to about 9:1; about 5:1 to about 8:1; about 5:1 to about 7:1; or about 5:1 to about 6:1, and including about 10:1 to about 20:1.

In one or more embodiments, the depositing of the agglomerates onto the porous walls further comprises passing the gaseous carrier stream through the porous walls of the honeycomb body, wherein the walls of the honeycomb body filter out at least some of the agglomerates by trapping the filtered agglomerates on or in the walls of the honeycomb body. In one or more embodiments, the depositing of the agglomerates onto the porous walls comprises filtering the agglomerates from the gaseous carrier stream with the porous walls of the plugged honeycomb body.

Post-Treatment 430. A post-treatment may optionally be used to adhere the agglomerates to the honeycomb body, and/or to each other. That is, in one or more embodiments, at least some of the agglomerates adhere to the porous walls. In one or more embodiments, the post-treatment comprises heating and/or curing the binder when present according to one or more embodiments. In one or more embodiments, the binder material causes the agglomerates to adhere or stick to the walls of the honeycomb body. In one or more embodiments, the binder material tackifies the agglomerates.

Depending on the binder composition, the curing conditions are varied. According to embodiments, a low temperature cure reaction is utilized, for example, at a temperature of ≤100° C. In embodiments, the curing can be completed in the vehicle exhaust gas with a temperature ≤950° C. A calcination treatment is optional, which can be performed at a temperature ≤650° C. Exemplary curing conditions are: a temperature range of from 40° C. to 200° C. for 10 minutes to 48 hours.

In one or more embodiments, the agglomerates and/or aggregates thereof are heated after being deposited on the honeycomb body. In one or more embodiments, the heating of the agglomerates causes an organic component of the binder material to be removed from the deposited agglomerates. In one or more embodiments, the heating of the agglomerates causes an inorganic component of the binder material to physically bond the agglomerates to the walls of the honeycomb body. In one or more embodiments, the heating of the agglomerates causes an inorganic component of the binder to form a porous inorganic structure on the porous walls of the honeycomb body. In one or more embodiments, the heating of the deposited agglomerates burns off or volatilizes an organic component of the binder material from the deposited agglomerates.

In one or more embodiments, the porosity of the magnetic susceptor material, disposed on the walls of the honeycomb body, as measured by mercury intrusion porosimetry, SEM, or X-ray tomography is in a range of from about 20% to about 95%, or from about 25% to about 95%, or from about 30% to about 95%, or from about 40% to about 95%, or from about 45% to about 95%, or from about 50% to about 95%, or from about 55% to about 95%, or from about 60% to about 95%, or from about 65% to about 95%, or from about 70% to about 95%, or from about 75% to about 95%, or from about 80% to about 95%, or from about 85% to about 95%, from about 30% to about 95%, or from about 40% to about 95%, or from about 45% to about 95%, or from about 50% to about 95%, or from about 55% to about 95%, or from about 60% to about 95%, or from about 65% to about 95%, or from about 70% to about 95%, or from about 75% to about 95%, or from about 80% to about 95%, or from about 85% to about 95%, or from about 20% to about 90%, or from about 25% to about 90%, or from about 30% to about 90%, or from about 40% to about 90%, or from about 45% to about 90%, or from about 50% to about 90%, or from about 55% to about 90%, or from about 60% to about 90%, or from about 65% to about 90%, or from about 70% to about 90%, or from about 75% to about 90%, or from about 80% to about 90%, or from about 85% to about 90%, or from about 20% to about 85%, or from about 25% to about 85%, or from about 30% to about 85%, or from about 40% to about 85%, or from about 45% to about 85%, or from about 50% to about 85%, or from about 55% to about 85%, or from about 60% to about 85%, or from about 65% to about 85%, or from about 70% to about 85%, or from about 75% to about 85%, or from about 80% to about 85%, or from about 20% to about 80%, or from about 25% to about 80%, or from about 30% to about 80%, or from about 40% to about 80%, or from about 45% to about 80%, or from about 50% to about 80%, or from about 55% to about 80%, or from about 60% to about 80%, or from about 65% to about 80%, or from about 70% to about 80%, or from about 75% to about 80%.

In one or more embodiments, the deposits of magnetic susceptor material on walls of the honeycomb body is very thin compared to thickness of the base portion of the walls of the honeycomb body. The magnetic susceptor material can be formed by methods that permit the layer to be applied to surfaces of walls of the honeycomb body in very thin layers. In embodiments, the average thickness of the magnetic susceptor material on the base portion of the walls of the honeycomb body is greater than or equal to 0.5 μm and less than or equal to 50 μm, or greater than or equal to 0.5 μm and less than or equal to 45 μm, greater than or equal to 0.5 μm and less than or equal to 40 μm, or greater than or equal to 0.5 μm and less than or equal to 35 μm, or greater than or equal to 0.5 μm and less than or equal to 30 μm, greater than or equal to 0.5 μm and less than or equal to 25 μm, or greater than or equal to 0.5 μm and less than or equal to 20 μm, or greater than or equal to 0.5 μm and less than or equal to 15 μm, greater than or equal to 0.5 μm and less than or equal to 10 μm.

As discussed above, the magnetic susceptor material can be applied to the walls of the honeycomb body by methods that permit the inorganic material, which may be an inorganic layer, to have a small median pore size. This small median pore size allows the magnetic susceptor material to filter a high percentage of particulate and prevents particulate from penetrating honeycomb and settling into the pores of the honeycomb. A small median pore size of filtration material according to embodiments increases the filtration efficiency of the honeycomb body. In one or more embodiments, the material, which may be an inorganic layer, on the walls of the honeycomb body has a median pore size from greater than or equal to 0.1 μm to less than or equal to 5 μm, such as from greater than or equal to 0.5 μm to less than or equal to 4 μm, or from greater than or equal to 0.6 μm to less than or equal to 3 μm. For example, in embodiments, the material, which may be an inorganic layer, on the walls of the honeycomb body may have median pore sizes of about 0.5 μm, about 0.6 μm, about 0.7 μm, about 0.8 μm, about 0.9 μm, about 1 μm, about 2 μm, about 3 μm, or about 4 μm.

Although the magnetic susceptor material on the walls of the honeycomb body may, in embodiments, cover substantially 100% of the wall surfaces defining inner channels of the honeycomb body, in other embodiments, the material, which may be an inorganic layer, on the walls of the honeycomb body covers less than substantially 100% of the wall surfaces defining inner channels of the honeycomb body. For instance, in one or more embodiments, the material, which may be an inorganic layer, on the walls of the honeycomb body covers at least 70% of the wall surfaces defining inner channels of the honeycomb body, covers at least 75% of the wall surfaces defining inner channels of the honeycomb body, covers at least 80% of the wall surfaces defining inner channels of the honeycomb body, covers at least 85% of the wall surfaces defining inner channels of the honeycomb body, covers at least 90% of the wall surfaces defining inner channels of the honeycomb body, or covers at least 85% of the wall surfaces defining inner channels of the honeycomb body.

As described above with reference to FIGS. 1, 2, 3, and 4, the honeycomb body can have a first end and second end. The first end and the second end are separated by an axial length. In embodiments, the layer on the walls of the honeycomb body may extend the entire axial length of the honeycomb body (i.e., extends along 100% of the axial length). However, in other embodiments, the material, which may be an inorganic layer, on the walls of the honeycomb body extends along at least 60% of the axial length, such as extends along at least 65% of the axial length, extends along at least 70% of the axial length, extends along at least 75% of the axial length, extends along at least 80% of the axial length, extends along at least 85% of the axial length, extends along at least 90% of the axial length, or extends along at least 95% of the axial length.

In embodiments, the deposits of the magnetic susceptor material is loaded in an amount of between 0.3 to 50 g/L on the honeycomb body, such as between 1 to 45 g/L on the honeycomb body, or between 3 to 40 g/L on the honeycomb body. In other embodiments, the layer is between 1 to 30 g/l on the honeycomb body, such as between 1 to 20 g/l or such as between 1 to 10 g/l, on the honeycomb body Loading of the magnetic susceptor material is weight of added material in grams divided by the geometric part volume in liters. The geometric part volume is based on outer dimensions of the honeycomb filter body (or plugged honeycomb body). In embodiments, the pressure drop (i.e., a clean pressure drop without soot or ash) across the honeycomb body compared to a honeycomb without a thin porous inorganic material, which may be an inorganic layer, is less than or equal to 20%, such as less than or equal to 9%, or less than or equal to 8%. In other embodiments, the pressure drop across the honeycomb body is less than or equal to 7%, such as less than or equal to 6%. In still other embodiments, the pressure drop across the honeycomb body is less than or equal to 5%, such as less than or equal to 4%, or less than or equal to 3%.

As stated above, and without being bound to any particular theory, small pore sizes in the layer on the walls of the honeycomb body allow the honeycomb body to have good filtration efficiency even before ash or soot build-up occurs in the honeycomb body. The filtration efficiency of honeycomb bodies is measured herein using the protocol outlined in Tandon et al., 65 Chemical Engineering Science 4751-60 (2010). As used herein, the initial filtration efficiency of a honeycomb body refers to a new or regenerated honeycomb body that does not comprise any measurable soot loading. In embodiments, the initial filtration efficiency (i.e., clean filtration efficiency) of the honeycomb body is greater than or equal to 70%, such as greater than or equal to 80%, or greater than or equal to 85%. In yet other embodiments, the initial filtration efficiency of the honeycomb body is greater than 90%, such as greater than or equal to 93%, or greater than or equal to 95%, or greater than or equal to 98%.

In embodiments, the magnetic susceptor material, which may be a filtration layer, on the walls of the honeycomb body may be comprised of one or a mixture of ferromagnetic or ferrimagnetic components, such as, for example, ceramic components selected from the group consisting of such as iron, cobalt, nickel or their alloys or oxides or mixtures thereof. A method for forming the deposits of magnetic susceptor material on the honeycomb body according to embodiments can allow for customization of the layer composition for a given application. This may be beneficial because the ceramic components may be combined to match, for example, the physical properties—such as, for example coefficient of thermal expansion (CTE) and Young's modulus, etc.—of the honeycomb body, which can improve the physical stability of the honeycomb body. In embodiments, the material, which may be an inorganic layer, on the walls of the honeycomb body may comprise cordierite, aluminum titanate, enstatite, mullite, forsterite, corundum (SiC), spinel, sapphirine, and periclase.

The properties of the deposits of the magnetic susceptor material, and, in turn, the honeycomb body overall are attributable to the ability of applying a thin, porous material, which may be an inorganic layer, having small median pore sizes to a honeycomb body.

In embodiments, the method of forming a honeycomb body comprises forming or obtaining an aerosol that comprises a magnetic susceptor material and a solvent. In one or more embodiments, the magnetic susceptor material is supplied by a metal oxide powder. In one or more embodiments, the magnetic susceptor material is supplied by a precursor.

In one or more embodiments, the aerosol, which is well-dispersed in a fluid, is directed to a honeycomb body, and the aerosol is deposited on the honeycomb body. In embodiments, the honeycomb body may have one or more of the channels plugged on one end, such as, for example, the first end 105 of the honeycomb body shown in FIG. 1 during the deposition of the aerosol to the honeycomb body. The plugged channels may, in embodiments, be removed after deposition of the aerosol. But, in other embodiments, the channels may remain plugged even after deposition of the aerosol. The pattern of plugging channels of the honeycomb body is not limited, and in embodiments all the channels of the honeycomb body may be plugged at one end. In other embodiments, only a portion of the channels of the honeycomb body may be plugged at one end. In such embodiments, the pattern of plugged and unplugged channels at one end of the honeycomb body is not limited and may be, for example, a checkerboard pattern where alternating channels of one end of the honeycomb body are plugged. By plugging all or a portion of the channels at one end of the honeycomb body during deposition of the aerosol, the aerosol may be evenly distributed within the channels 110 of the honeycomb body 100.

Embodiments of honeycomb bodies and methods for forming the same as disclosed and described herein are now provided.

According to one or more embodiments, binders with high temperature (e.g., greater than 400° C.) resistance are included in the deposits, which may be an inorganic layer, to enhance integrity of the material, at high temperatures encountered in automobile exhaust gas emissions treatment systems. In specific embodiments, the inorganic deposits comprise a binder in an amount of about 5 wt %. In one or more embodiments, the binder is an alkoxy-siloxane resin. In one or more embodiments, the binder is an inorganic binder. According to one or more embodiments, other potential inorganic and organic binders such as silicate (e.g. $Na_2SiO_3$), phosphate (e.g. $AlPO_4$, $AlH_2(PO_4)_3$), hydraulic cement (e.g. calcium aluminate), sol (e.g. $mSiO_2 \cdot nH_2O$, $Al(OH)_x \cdot (H_2O)_{6-x}$) and metal alkoxides, could also be utilized in the deposits to increase mechanical strength by an appropriate curing process.

EMBODIMENTS

Various embodiments are listed below. It will be understood that the embodiments listed below may be combined with all aspects and other embodiments in accordance with the scope of the invention.

Embodiment (a) An article comprising: a honeycomb body comprising porous ceramic walls having wall surfaces defining a plurality of inner channels; deposits comprising a magnetic susceptor material disposed on one or more portions of the porous ceramic walls; and a catalytic material within the honeycomb body and disposed separate from the deposits of the magnetic susceptor material; wherein a first number of inner channels comprising the deposits comprising the magnetic susceptor material is greater than or equal to a second number of inner channels comprising the catalytic material.

Embodiment (b) The article of embodiment (a), wherein the magnetic susceptor material disposed on one or more portions of all of the porous ceramic walls.

Embodiment (c) The article of any of embodiments (a) to (b), wherein the deposits of the magnetic susceptor material form a continuous layer on the porous ceramic walls.

Embodiment (d) The article of embodiment (c), wherein the continuous layer has an average thickness of greater than or equal to about 0.5 micrometers and less than or equal to 50 micrometers.

Embodiment (e) The article of embodiment (c), wherein the continuous layer has a porosity in a range of from about 20% to about 95%.

Embodiment (f) The article of any of embodiments (a) to (e), wherein the magnetic susceptor material comprises one or more of: iron, cobalt, nickel, or an alloy thereof, or an oxide thereof.

Embodiment (g) The article of any of embodiments (a) to (f), wherein the deposits comprise primary particles of the magnetic susceptor material and agglomerates thereof.

Embodiment (h) The article of embodiment (f), wherein the primary particles of the magnetic susceptor material comprise an average primary particle size in a range of 10 nanometers to 4 micrometers.

Embodiment (i) The article of embodiment (f), wherein the agglomerates of the magnetic susceptor material comprise an agglomerate median size $D_{50}$ in a range of 300 nanometers to 10 micrometers.

Embodiment (j) The article of any of embodiments (a) to (i), wherein the catalytic material is disposed in pores of the porous ceramic walls.

Embodiment (k) The article of any of embodiments (a) to (i), wherein the particles of the magnetic susceptible material are disposed on walls defining the inlet channels, and the catalytic material is disposed on walls defining the outlet channels.

Embodiment (l) The article of any of embodiments (a) to (i), wherein the magnetic susceptor material is disposed along a first axial distance on one or more portions of the porous ceramic walls, and the catalytic material is disposed along a second axial distance on one or more portions of the porous ceramic walls, wherein a sum of the first axial distance and the second axial distance is less than a total axial distance, and the magnetic susceptor material is not intermingled with the catalytic material, in respective channels.

Embodiment (m) The article of any of embodiments (a) to (i), wherein the deposits comprise a plurality of core-shell nanoparticles comprised of a core of primary nanoparticles of the magnetic susceptor material encapsulated by a shell, the primary nanoparticles of the magnetic susceptor material having an average primary particle size in a range of 10 nanometer to 50 nanometers.

Embodiment (n) The article of embodiment (m), wherein each of the shells of the core-shell nanoparticles comprises silica.

Embodiment (o) The article of embodiment (m), wherein each of the core-shell nanoparticles is coated with the catalytic material, wherein the magnetic susceptor material is disposed separate from the catalytic material by the shell.

Embodiment (p) The article of any of embodiments (a) to (o), wherein the deposits are free of precious metals.

Embodiment (q) The article of any of embodiments (a) to (p), wherein the deposits comprise a network of aggregated agglomerates of the magnetic susceptor material and a binder.

Embodiment (r) The article of embodiment (q), wherein the binder comprises a water-soluble silicate binder or an alcohol-soluble alkoxysiloxane binder.

Embodiment (s) The article of any of embodiments (a) to (r), wherein the catalytic material comprises: a platinum group metal (PGM), alumina, and an oxygen storage component.

Embodiment (t) An article comprising: a plugged honeycomb filter body comprising: porous ceramic walls; inlet channels which are plugged at a distal end of the plugged honeycomb filter body; outlet channels which are plugged at a proximal end of the plugged honeycomb filter body; deposits comprising a magnetic susceptor material disposed within the plugged honeycomb filter body disposed on one or more portions of the inlet channels and/or all of the outlet channels; a catalytic material within the plugged honeycomb filter body and disposed separate from the deposits of the magnetic susceptor material.

Embodiment (u) The article of embodiment (t), wherein the deposits of the magnetic susceptor material are disposed on one or more portions of all of the inlet channels, or all of the outlet channels, or all of both the inlet and outlet channels.

Embodiment (v) The article of any of embodiments (t) to (u), comprising deposits of non-magnetic susceptor material between the deposits of the magnetic susceptor material and the catalytic material.

Embodiment (w) The article of any of embodiments (t) to (v), wherein the deposits of the magnetic susceptor material form a continuous layer on the porous ceramic walls.

Embodiment (x) The article of embodiment (w), wherein the continuous layer has an average thickness of greater than or equal to about 0.5 micrometers and less than or equal to 50 micrometers.

Embodiment (y) The article of embodiment (x), wherein the continuous layer has a porosity in a range of from about 20% to about 95%.

Embodiment (z) The article of any of embodiments (t) to (y), wherein the porous ceramic walls comprise a porosity of greater than or equal to 40% to less than or equal to 70%.

Embodiment (aa) The article of any of embodiments (t) to (z), wherein the magnetic susceptor material comprises one or more of: iron, cobalt, nickel, or an alloy thereof, or an oxide thereof.

Embodiment (bb) The article of any of embodiments (t) to (aa), wherein the deposits comprise primary particles of the magnetic susceptor material and agglomerates thereof.

Embodiment (cc) The article of embodiment (bb), wherein the primary particles of the magnetic susceptor material comprise an average primary particle size in a range of 10 nanometers to 4 micrometers.

Embodiment (dd) The article of any of embodiments (bb) to (cc), wherein the agglomerates of the magnetic susceptor material comprise an agglomerate median size $D_{50}$ in a range of 300 nanometers to 10 micrometers.

Embodiment (ee) The article of any of embodiments (t) to (bb), wherein the catalytic material is disposed in pores of the porous ceramic walls.

Embodiment (ff) The article of any of embodiments (t) to (bb), wherein the deposits of the magnetic susceptor material are disposed on walls defining the inlet channels, and the catalytic material is disposed on walls defining the outlet channels.

Embodiment (gg) The article of any of embodiments (t) to (bb), wherein the deposits of the magnetic susceptor material are disposed on walls defining the outlet channels, and the catalytic material is disposed on walls defining the inlet channels.

Embodiment (hh) The article of any of embodiments (t) to (bb), wherein the deposits of the magnetic susceptor material are disposed along a first axial distance on one or more portions of the porous ceramic walls, and the catalytic material is disposed along a second axial distance on one or more portions of the porous ceramic walls, wherein a sum of the first axial distance and the second axial distance is less than a total axial distance, and the magnetic susceptor material is not intermingled with the catalytic material, in respective channels.

Embodiment (ii) The article any of embodiments (t) to (bb), wherein the deposits comprise a plurality of core-shell nanoparticles comprised of a core of primary nanoparticles of the magnetic susceptor material encapsulated by a shell, the primary nanoparticles of the magnetic susceptor material having an average primary particle size in a range of 10 nanometer to 50 nanometers.

Embodiment (jj) The article of embodiment (ii), wherein each of the shells of the core-shell nanoparticles comprises silica.

Embodiment (kk) The article of embodiment (ii) or (jj), wherein each of the core-shell nanoparticles is coated with the catalytic material, wherein the magnetic susceptor material is disposed separate from the catalytic material by the shell.

Embodiment (ll) The article of any of embodiments (t) to (kk), wherein the deposits are free of precious metals.

Embodiment (mm) The article of any of embodiments (t) to (ll), wherein the deposits comprise a network of aggregated agglomerates of the magnetic susceptor material and a binder.

Embodiment (nn) The article of embodiment (mm), wherein the binder comprises a water-soluble silicate binder or an alcohol-soluble alkoxysiloxane binder.

Embodiment (oo) An exhaust gas treatment system comprising the article of any of embodiments (aa) to (nn) located downstream of a gasoline engine.

Embodiment (pp) A method for making an emissions treatment article, the method comprising: coating a catalytic material within a honeycomb body comprising porous ceramic walls having wall surfaces defining a plurality of inner channels; and coating particles of a magnetic susceptor material within the honeycomb body such that the catalytic material is disposed separate from the particles of the magnetic susceptible material; and a first number of inner channels comprising the deposits comprising the magnetic susceptor material is greater than or equal to a second number of inner channels comprising the catalytic material.

Embodiment (qq) The method of embodiment (pp), wherein the magnetic susceptor material disposed on one or more portions of all of the porous ceramic walls.

Embodiment (rr) The method of any of embodiments (pp) to (qq) comprising forming a continuous layer of the deposits of the magnetic susceptor material on the porous ceramic walls.

Embodiment (ss) The method of any of embodiments (pp) to (rr), wherein the deposits are free of precious metals.

Embodiment (tt) The method of any of embodiments (pp) to (ss), wherein the coating of the particles of the magnetic susceptor material comprises: atomizing the particles of the magnetic susceptor material into liquid-particulate droplets comprised of a liquid vehicle and the particles; evaporating substantially all of the liquid vehicle from the droplets to form agglomerates comprised of the magnetic susceptor material; and depositing the agglomerates onto the ceramic porous walls to form the deposits.

Embodiment (uu) The method of embodiment (tt), wherein the liquid-particulate droplets further comprise a binder, and the agglomerates further comprise the binder.

Embodiment (vv) The method of embodiment (uu), wherein the deposits comprise a network of aggregated agglomerates of the magnetic susceptor material and the binder.

Embodiment (ww) The method of embodiment (tt) or (uu), wherein the binder comprises a water-soluble silicate binder or an alcohol-soluble alkoxysiloxane binder.

Embodiment (xx) The method of any of embodiments (pp) to (ww), wherein the coating of the catalytic material comprises: preparing a slurry of a platinum group metal (PGM), alumina, and an oxygen storage component; and applying the slurry within the honeycomb body.

Embodiment (yy) The method of any of embodiments (pp) to (xx) comprising depositing a filler material after the coating of the catalytic material and before the coating of the particles of the magnetic susceptor material.

Embodiment (zz) The method of embodiment (yy) comprising burning off the filler material prior to use of the honeycomb body for treatment of combustion engine emissions.

Embodiment (aaa) A method for making an emissions treatment article, the method comprising: coating a catalytic material within a plugged honeycomb filter body comprising porous ceramic walls defining a plurality of inner channels, wherein inlet channels are plugged at a distal end of the plugged honeycomb filter body, and outlet channels are plugged at a proximal end of the plugged honeycomb filter body; and coating particles of a magnetic susceptor material within the plugged honeycomb filter body, such that the catalytic material is disposed separate from the particles of the magnetic susceptible material; and deposits of the magnetic susceptor material are disposed on one or more portions of the porous ceramic walls.

Embodiment (bbb) The method of embodiment (aaa), wherein a first number of inner channels comprising the deposits comprising the magnetic susceptor material is greater than or equal to a second number of inner channels comprising the catalytic material.

Embodiment (ccc) The method of any of embodiments (aaa) to (bbb), wherein the deposits of the magnetic susceptor material are disposed on one or more portions of all of the inlet channels, or all of the outlet channels, or all of both the inlet and outlet channels.

Embodiment (ddd) The method of any of embodiments (aaa) to (ccc) comprising forming a continuous layer of the deposits of the magnetic susceptor material on the porous ceramic walls.

Embodiment (eee) The method of embodiment (ddd), wherein the deposits are free of precious metals.

Embodiment (fff) The method of any of embodiments (aaa) to (eee), wherein the coating of the particles of the magnetic susceptor material comprises: atomizing the particles of the magnetic susceptor material into liquid-particulate droplets comprised of a liquid vehicle and the particles; evaporating substantially all of the liquid vehicle from the droplets to form agglomerates comprised of the magnetic susceptor material; and depositing the agglomerates onto the ceramic porous walls to form the deposits.

Embodiment (ggg) The method of any of embodiments (aaa) to (fff), wherein the liquid-particulate droplets further comprise a binder, and the agglomerates further comprise the binder.

Embodiment (hhh) The method of embodiment (ggg), wherein the deposits comprise a network of aggregated agglomerates of the magnetic susceptor material and the binder.

Embodiment (iii) The method of embodiment (ggg) or (hhh), wherein the binder comprises a water-soluble silicate binder or an alcohol-soluble alkoxysiloxane binder.

Embodiment (jjj) The method of any of embodiments (aaa) to (iii), wherein the coating of the catalytic material comprises: preparing a slurry of a platinum group metal (PGM), alumina, and an oxygen storage component; and applying the slurry within the plugged honeycomb filter body.

Embodiment (kkk) The method of any of embodiments (aaa) to (lll) comprising depositing a filler material after the coating of the catalytic material and before the coating of the particles of the magnetic susceptor material.

Embodiment (lll) The method of embodiment (kkk) comprising burning off the filler material prior to use of the plugged honeycomb filter body for treatment of combustion engine emissions.

Embodiment (mmm) A method for treating emissions from a gasoline engine, the method comprising: contacting a gaseous stream from the gasoline engine with an emission treatment article comprising: a honeycomb body comprising: a magnetic susceptor material disposed on one or more portions of porous ceramic walls having wall surfaces defining a plurality of inner channels; and a catalytic material within the honeycomb body, wherein the catalytic material is disposed separate from the magnetic susceptible material, and a first number of inner channels comprising the deposits comprising the magnetic susceptor material is greater than or equal to a second number of inner channels comprising the catalytic material.

Embodiment (nnn) The method of embodiment (mmm), wherein the gaseous stream comprises hydrocarbons, carbon monoxide, nitrogen oxides, and particulates.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. An article comprising:

a honeycomb body comprising porous ceramic walls having wall surfaces defining a plurality of inner channels comprising first channels and second channels that extend between an inlet end and an outlet end;

deposits comprising a magnetic susceptor material disposed on the wall surfaces defining the first channels; and a catalytic material disposed on the wall surfaces or within the walls defining the second channels and disposed separate from the deposits of the magnetic susceptor material;

wherein a first number of the first channels comprising the deposits comprising the magnetic susceptor material is greater than or equal to a second number of the second channels comprising the catalytic material, and wherein the magnetic susceptor material and the catalytic material are not both disposed in the first channels, and wherein the magnetic susceptor material and the catalytic material are not both disposed in the second channels.

2. The article of claim 1, wherein the deposits of the magnetic susceptor material form a continuous layer on the porous ceramic walls.

3. The article of claim 2, wherein the continuous layer has an average thickness of greater than or equal to about 0.5 micrometers and less than or equal to 50 micrometers.

4. The article of claim 2, wherein the continuous layer has a porosity in a range of from about 20% to about 95%.

5. The article of claim 1, wherein the deposits comprise primary particles of the magnetic susceptor material and agglomerates thereof.

6. The article of claim 5, wherein the primary particles of the magnetic susceptor material comprise an average primary particle size in a range of 10 nanometers to 4 micrometers.

7. The article of claim 5, wherein the agglomerates of the magnetic susceptor material comprise an agglomerate median size $D_{50}$ in a range of 300 nanometers to 10 micrometers.

8. The article of claim 1, wherein the first channels are inlet channels plugged at or near the outlet end, the second channels are outlet channels plugged at or near the inlet end, and the catalytic material is disposed on the wall surfaces defining the outlet channels.

9. The article of claim 1, wherein the magnetic susceptor material is disposed along a first axial distance of the first channels, and the catalytic material is disposed along a second axial distance of the second channels, and wherein a sum of the first axial distance and the second axial distance is less than a total axial distance.

10. The article of claim 1, wherein the deposits comprise a plurality of core-shell nanoparticles comprised of a core of primary nanoparticles of the magnetic susceptor material encapsulated by a shell, the primary nanoparticles of the magnetic susceptor material having an average primary particle size in a range of 10 nanometer to 50 nanometers.

11. The article of claim 10, wherein each of the shells of the core-shell nanoparticles comprises silica.

12. The article of claim 1, wherein the deposits are free of precious metals.

13. The article of claim 1, wherein the deposits comprise a network of aggregated agglomerates of the magnetic susceptor material and a binder.

14. An exhaust gas treatment system comprising the article of any of claim 1 located downstream of a gasoline engine.

15. An article comprising:

a plugged honeycomb filter body comprising:

porous ceramic walls;

inlet channels which are plugged at a distal end of the plugged honeycomb filter body;

outlet channels which are plugged at a proximal end of the plugged honeycomb filter body;

deposits comprising a magnetic susceptor material disposed within the plugged honeycomb filter body disposed on one or more portions of the porous ceramic walls of the inlet channels but not on the porous ceramic walls of the outlet channels;

a catalytic material within the plugged honeycomb filter body and disposed separate from the deposits of the magnetic susceptor material, the catalytic material disposed on or within one or more portions of the porous ceramic walls of the outlet channels but not on the porous ceramic walls of the inlet channels.

* * * * *